United States Patent
Toonen et al.

(10) Patent No.: US 8,329,292 B2
(45) Date of Patent: Dec. 11, 2012

(54) ABSORBENT ARTICLE FOR ABSORBING MOISTURE ON A STRUCTURE

(75) Inventors: James E. Toonen, Mendota Heights, MN (US); Sharf U. Ahmed, Woodbury, MN (US); Stephen G. Rippe, White Bear Lake, MN (US); Charles W. Graves, Lake Elmo, MN (US)

(73) Assignee: H.B. Fuller Company, St. Paul, MN (US)

( * ) Notice: Subject to any disclaimer, the term of this patent is extended or adjusted under 35 U.S.C. 154(b) by 535 days.

(21) Appl. No.: 11/895,178

(22) Filed: Aug. 23, 2007

(65) Prior Publication Data

US 2008/0050554 A1  Feb. 28, 2008

Related U.S. Application Data

(60) Provisional application No. 60/839,797, filed on Aug. 24, 2006.

(51) Int. Cl.
 *B32B 3/06* (2006.01)
 *B65D 69/00* (2006.01)

(52) U.S. Cl. ........ 428/354; 428/40.1; 428/41.8; 428/99; 206/223

(58) Field of Classification Search .................. None
 See application file for complete search history.

(56) References Cited

U.S. PATENT DOCUMENTS

| | | | |
|---|---|---|---|
| 4,076,663 A | 2/1978 | Masuda et al. | |
| 4,093,776 A | 6/1978 | Aoki et al. | |
| 4,573,986 A * | 3/1986 | Minetola et al. | 604/366 |
| 4,666,983 A | 5/1987 | Tsubakimoto et al. | |
| 4,734,478 A | 3/1988 | Tsubakimoto et al. | |
| 4,769,024 A * | 9/1988 | Pike et al. | 604/390 |
| 4,850,991 A | 7/1989 | Nakanishi et al. | |
| 4,977,211 A | 12/1990 | Doi et al. | |
| 5,075,373 A | 12/1991 | Takemori et al. | |
| 5,143,961 A | 9/1992 | Scholl et al. | |
| 5,149,332 A * | 9/1992 | Walton et al. | 604/358 |
| 5,281,207 A | 1/1994 | Chmieleweski et al. | |
| 5,567,744 A | 10/1996 | Nagata et al. | |
| 5,591,149 A * | 1/1997 | Cree et al. | 604/378 |
| 5,731,365 A | 3/1998 | Engelhardt et al. | |

(Continued)

FOREIGN PATENT DOCUMENTS

DE   3842327   6/1990

(Continued)

OTHER PUBLICATIONS

Dictionary.com "Contact", Nov. 2011.*

(Continued)

*Primary Examiner* — Callie Shosho
*Assistant Examiner* — Cheng Huang
(74) *Attorney, Agent, or Firm* — Kirsten Stone; Kristi Halloran

(57) ABSTRACT

A method of using an absorbent article where the method includes adhering at least a portion of an absorbent article to a surface of a window through a pressure sensitive adhesive composition. The absorbent article includes an exterior surface, an acquisition layer, superabsorbent polymer, a first layer that has an exterior surface and an interior surface, and a pressure sensitive attachment adhesive composition, the superabsorbent polymer being disposed between the acquisition layer and the interior surface of the first layer, and the pressure sensitive attachment adhesive composition being disposed on the exterior surface of the absorbent article.

19 Claims, 8 Drawing Sheets

U.S. PATENT DOCUMENTS

| | | | |
|---|---|---|---|
| 5,876,855 A | 3/1999 | Wong et al. | |
| 5,942,569 A | 8/1999 | Simmons et al. | |
| 6,051,748 A | 4/2000 | Auguste et al. | |
| 6,312,417 B1* | 11/2001 | Hansson | 604/385.02 |
| 6,458,877 B1 | 10/2002 | Ahmed et al. | |
| 6,534,572 B1 | 3/2003 | Ahmed et al. | |
| 6,849,672 B2 | 2/2005 | Mehawej et al. | |
| 6,852,905 B2* | 2/2005 | Baker | 604/369 |
| 7,081,498 B2 | 7/2006 | Moeller et al. | |
| 7,091,300 B2 | 8/2006 | Luhmann et al. | |
| 2003/0187413 A1* | 10/2003 | Fell | 604/367 |
| 2004/0122394 A1* | 6/2004 | Fell et al. | 604/378 |
| 2004/0186448 A1* | 9/2004 | Misek et al. | 604/367 |
| 2005/0096428 A1 | 5/2005 | Mehawej et al. | |
| 2005/0148984 A1* | 7/2005 | Lindsay et al. | 604/387 |
| 2005/0182194 A1* | 8/2005 | He et al. | 525/89 |
| 2005/0221045 A1* | 10/2005 | Bober | 428/43 |
| 2006/0004336 A1* | 1/2006 | Zhang et al. | 604/368 |
| 2006/0173434 A1* | 8/2006 | Zoromski et al. | 604/374 |

FOREIGN PATENT DOCUMENTS

| | | |
|---|---|---|
| EP | 0 554 832 | 8/1993 |
| EP | 0 863 184 | 9/1998 |
| EP | 0 919 590 | 6/1999 |
| EP | 1 013 291 A1 | 6/2000 |
| EP | 1 266 915 | 8/2001 |
| FR | 2 730 242 | 8/1996 |
| JP | H6-80806 | 3/1994 |
| WO | WO 93/22048 | 11/1993 |
| WO | WO 93/22998 | 11/1993 |
| WO | WO 98/27559 | 6/1998 |
| WO | WO 99/57201 | 11/1999 |
| WO | WO 01/41818 | 6/2001 |
| WO | WO 01/55276 | 8/2001 |
| WO | WO 01/59025 | 8/2001 |

OTHER PUBLICATIONS

Sumitomo Seika, Super Absorbant Polymer Aqua Keep, Product Literature, Jan. 2000, 13 pages.

* cited by examiner

ABSORBENT ARTICLE FOR ABSORBING MOISTURE ON A STRUCTURE

CROSS-REFERENCE TO RELATED APPLICATIONS

This application claims the benefit of U.S. Provisional Application No. 60/839,797, filed Aug. 24, 2006, and incorporated herein.

BACKGROUND

The invention relates to absorbing condensate on a surface of a substrate.

Indoor moisture can result from of a variety of factors including, e.g., building materials, cooking, showering, dishwashing, laundry and breathing. These sources of moisture can increase the humidity present in a home, which can lead to increased water condensation on the surfaces of windows and doors. During the winter, for example, condensation often forms on glass surfaces, e.g., windows, when air that comes in contact with the surface is cooled. As a result, water droplets quickly form on the surface and can run down the surface and, in the case of windows, into the components of the window or the surrounding walls, which can cause mold and rot.

SUMMARY

In one aspect, the invention features a method of using an absorbent article disclosed herein, wherein the method includes adhering at least a portion of an absorbent article to a surface of a window through an adhesive composition. In one embodiment the absorbent article includes an exterior surface, an acquisition layer, superabsorbent polymer, a first layer having an exterior surface and an interior surface, and a pressure sensitive attachment adhesive composition, the superabsorbent polymer being disposed between the acquisition layer and the interior surface of the first layer, the pressure sensitive attachment adhesive composition being disposed on an exterior surface of the absorbent article. In one embodiment, the first layer includes a layer of closed cell foam. In other embodiments, the first layer includes a thermoplastic film. In another embodiment the superabsorbent polymer is in the form of a hot melt superabsorbent polymer composition that includes thermoplastic polymer and superabsorbent polymer particles. In some embodiments, the hot melt composition further includes an additive selected from the group consisting of scenting agents, antimicrobial agents, antifungal agents, biocide, and combinations thereof.

In some embodiments, the first layer is bonded to the acquisition layer through the pressure sensitive attachment adhesive composition.

In other embodiments, the adhering includes adhering the absorbent article to a glass surface of the window.

In one embodiment, the absorbent further includes a pressure sensitive adhesive composite that includes a nonwoven web and a pressure sensitive attachment adhesive composition disposed on the nonwoven web of the composite. In another embodiment, the first layer is bonded to the acquisition layer and the superabsorbent polymer through the pressure sensitive adhesive composite. In other embodiments, the pressure sensitive attachment adhesive composition is disposed on at least one of the acquisition layer and the interior surface of the first layer.

In some embodiments, the absorbent article further includes a predetermined crease extending along a major portion of a longitudinal extent of the absorbent article.

In other embodiments, the absorbent article includes a top edge and a bottom edge opposite the top edge, the pressure sensitive attachment adhesive extending from the bottom edge of the absorbent article toward the top edge of the absorbent article such that a portion of the second exterior surface of the absorbent article extending from the top edge toward the bottom edge is free of the pressure sensitive attachment adhesive composition and is free of adhesion to the surface of the window.

In one embodiment, the absorbent article is in the form of a tape.

In other embodiments, the acquisition layer includes absorbent fibers.

In another embodiment, the acquisition layer and the first layer include heat sealable tissue exhibiting at least one of an acquisition property and a distribution property. In some embodiments, the absorbent article further includes a distribution layer.

In some embodiments, the absorbent article further includes a nonwoven web disposed between the acquisition layer and the superabsorbent polymer.

In another embodiment, the method further includes attaching a clip to the window surface, and affixing a portion of the absorbent article in the clip.

In other embodiments, the method of using an absorbent article includes adhering at least a portion of an absorbent article to a surface on which moisture condenses through a pressure sensitive attachment adhesive composition, the absorbent article including an exterior surface, an acquisition layer, superabsorbent polymer, a first layer having an exterior surface and an interior surface, and a pressure sensitive attachment adhesive composition, the superabsorbent polymer being disposed between the acquisition layer and the interior surface of the first layer, the pressure sensitive attachment adhesive composition being disposed on an exterior surface of the absorbent article. In some embodiments, the surface on which moisture condenses includes at least one of paint, wood, metal and polymer. In some embodiments, the pressure sensitive attachment adhesive is disposed on at least one of the acquisition layer and the interior surface of the first layer.

In another aspect, the invention features a kit that includes an absorbent article described herein in the form of a tape wound up on itself in the form of a roll, and at least one clip for engaging the absorbent article.

In other aspects, the invention features an absorbent article that includes an exterior surface, an interior surface and a longitudinal extent, an acquisition layer that includes absorbent fibers, superabsorbent polymer, a layer of closed cell foam having an exterior surface and an interior surface, and a pressure sensitive attachment adhesive composition, the superabsorbent polymer being disposed between the nonwoven web and the layer of foam, the pressure sensitive attachment adhesive composition being disposed on at least one of the acquisition layer and the interior surface of the layer of foam and available for contact with a surface. In one embodiment, the absorbent article further includes a pressure sensitive adhesive composite that includes a nonwoven web and the pressure sensitive attachment adhesive composition disposed on the nonwoven web of the composite. In one embodiment, the superabsorbent polymer is in the form of a hot melt superabsorbent polymer composition that includes a thermoplastic polymer and the superabsorbent polymer.

In other embodiments, the absorbent article includes a first layer that includes a first non-woven web, a second layer that includes a first tissue, superabsorbent polymer, a third layer that includes a second tissue and a fourth layer that includes a second non-woven web, the superabsorbent polymer being disposed between the first tissue and the second tissue, the first tissue being disposed between the superabsorbent polymer and the first non-woven web, and the second tissue being disposed between the superabsorbent polymer and the second non-woven web.

In another embodiment, the absorbent article includes a first layer that includes a thermoplastic polymer film, superabsorbent polymer, a second layer that includes tissue having an area weight of at least 45 $g/m^2$, a third layer that includes a non-woven web, and an adhesive composition disposed on the non-woven web, the superabsorbent polymer being disposed between the thermoplastic polymer and the tissue, and the tissue being disposed between the superabsorbent polymer and the non-woven web.

In other embodiments, the absorbent article includes a first layer that includes a thermoplastic polymer film, superabsorbent polymer, a second layer that includes tissue and a third layer that includes a non-woven web, the superabsorbent polymer being disposed between the thermoplastic polymer film and the tissue, and the tissue being disposed between the superabsorbent polymer and the non-woven web. In some embodiments, an adhesive composition is disposed on the thermoplastic polymer film.

In some embodiments, the absorbent article includes a first layer that includes a first non-woven web, a second layer that includes a first tissue, superabsorbent polymer, a third layer that includes a second tissue and a fourth layer that includes a second non-woven web, the superabsorbent polymer being disposed between the first tissue and the second tissue, the first tissue being disposed between the superabsorbent polymer and the first non-woven web, and the second tissue being disposed between the superabsorbent polymer and the second non-woven web.

The present invention features an absorbent article that exhibits good adsorption and can be adhered to a substrate, e.g., a window, a wall (e.g., a back splash) or a door, such that it is available to absorb moisture that has condensed on a surface of the substrate. The absorbent article maintains absorbent and adsorbed moisture in the article and in some constructions remains dry to the touch.

Other features and advantages will be apparent from the following description of the preferred embodiments and from the claims.

GLOSSARY

In reference to the invention, these terms have the meanings set forth below:

The term "tack" means the property of a material that enables it to form a bond of measurable strength on contact with a surface.

DETAILED DESCRIPTION

The absorbent article includes a first layer, a second layer, and an absorbent layer disposed between the first layer and the second layer, and optionally an adhesive composition for adhering the absorbent article to a substrate such as a glass pane of a window. The absorbent article when in contact with (e.g., adhered to) the window is available for absorbing condensate that accumulates on the window and contacts the absorbent article. At least one of the first layer and the second layer is liquid permeable such that when a liquid, e.g., water condensate, contacts the layer it will pass through the layer and into contact with the absorbent layer. For ease of description, the absorbent article will be described in conjunction with its use on a window, e.g., a glass pane of a window. It is to be understood, however, that the article can be used on any substrate or structure on which moisture condenses including, e.g., doors and walls.

Figure 1A:
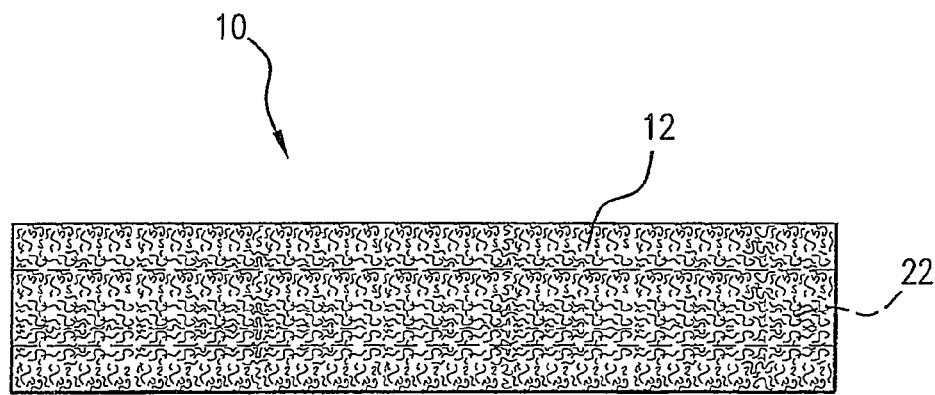
FIG. 1A is a front view of an absorbent article according to one embodiment of the invention.
Figure 1B:
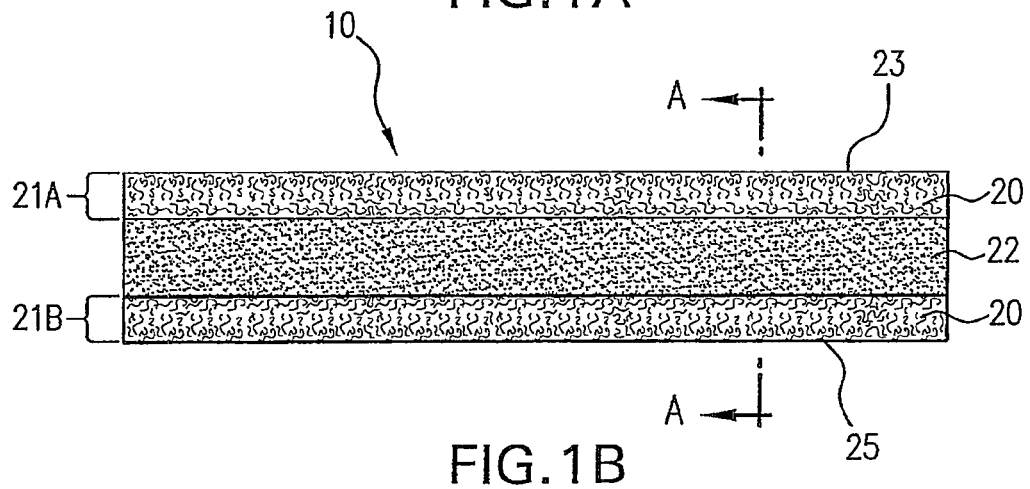
FIG. 1B is a back view of the absorbent article of FIG. 1A.
Figure 2:
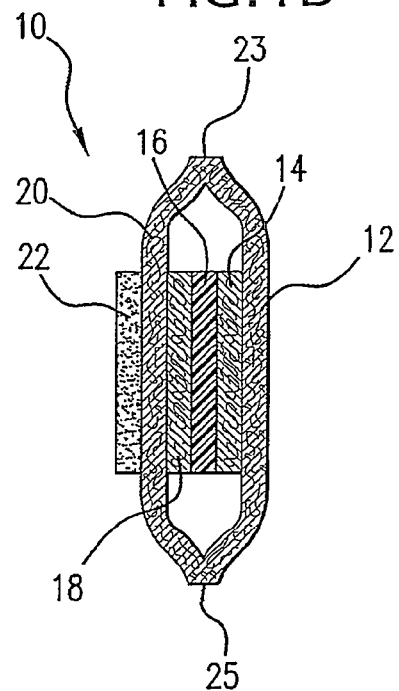
FIG. 2 depicts a cross-sectional view of the absorbent article of FIG. 1B taken along view line A-A.

FIGS. 1 and 2 illustrate an absorbent article 10 that includes a first layer 12 that includes a first non-woven web, a second layer 14 that includes a first tissue, superabsorbent polymer 16, a third layer 18 that includes a second tissue, and a fourth layer 20 that includes a second non-woven web. The superabsorbent polymer 16 is disposed between the second layer 14 and the third layer 18. An attachment adhesive composition 22 is disposed on a portion of second non-woven web of the fourth layer 20 and is available for contact with a surface of a substrate, e.g., glass, wood and polymer substrates, so that the absorbent article 10 can be adhered to the surface through the attachment adhesive composition 22. The edges along the perimeter of the first non-woven web of the first layer 12 are sealed to the edges along the perimeter of the second non-woven web of the fourth layer 20 to enclose the first tissue of the second layer 14, the superabsorbent polymer 16 and the second tissue of the third layer 18. A construction adhesive (not shown) maintains the components of the absorbent article in a fixed relationship with respect to one another through an adhesive bond. A release liner is optionally disposed on the attachment adhesive composition.

In some embodiments, the absorbent article is constructed to maintain dry superabsorbent polymer, as well as swelling superabsorbent polymer, within the absorbent article. Various methods and mechanisms can be used to maintain the superabsorbent polymer in the absorbent article including, e.g., sealing at least two layers of the absorbent article along at least one edge of the absorbent article, at points within the body of the article and combinations thereof. The seal can be formed through a variety of mechanisms including, e.g., an adhesive composition, a heat seal, a sonic weld, mechanical device (e.g., clip, clamps, tongue and groove mechanisms, and combinations thereof), and combinations thereof. The seal can be formed between any suitable combination of layers and components of the absorbent article. In one embodiment, at least one edge along the perimeter of each of the exterior layers of the absorbent article are sealed together to enclose the other layers and components of the absorbent article. In other embodiments, a first set of two opposite edges (e.g., a top and bottom edge) of the exterior layers of the absorbent article are sealed together and a second set of two opposite edges (e.g., two side edges) are unsealed.

The attachment adhesive composition is disposed on the exterior surface of the absorbent article to facilitate adhesion of the absorbent article to a surface of a substrate. The attachment adhesive composition can be present on a portion of a surface of the absorbent article or on the entire substrate contacting surface of the absorbent article. In some embodiments, the attachment adhesive composition is present on from about 10% to about 90% of the area of the exterior, substrate contacting surface of the absorbent article, while in other embodiments the attachment adhesive is present on from about 25% of to about 75% of the area of the exterior, substrate contacting surface of the absorbent article. In other embodiments, the attachment adhesive composition is disposed on the substrate contacting surface of the absorbent article and extends from a region near a first edge (e.g., a bottom edge) of the absorbent article toward a second edge (e.g., a top edge) of the absorbent article opposite the first edge a distance including, e.g., no greater than 75% of the distance from the first edge to the second edge, no greater than 60% of the distance from the first edge to the second edge, or even no greater than 50% of the distance from the first edge to the second edge. In further embodiments, the substrate contacting surface of the absorbent article includes two portions that are free of an attachment adhesive composition, an example of which is illustrated in FIGS. 1-2. In the embodiment illustrated in FIGS. 1-2, the first attachment adhesive-free portion 21A of the substrate contacting surface extends from a first edge 23 (e.g., a top edge) of the absorbent article toward a second edge 25 (e.g., a bottom edge) of the absorbent article 10, and the second attachment adhesive-free portion 21B extends from the second edge 25 of the absorbent article 10 toward the first edge 23 of the absorbent article 10. In other embodiments, the absorbent article is free of an attachment adhesive composition.

The attachment adhesive composition on the exterior surface of the absorbent article can be any adhesive composition suitable for adhering the absorbent article to a desired surface of a window including, e.g., low tack adhesives, removable adhesives, repositionable adhesives, remoistenable adhesives, pressure sensitive adhesives, hot melt pressure sensitive adhesives, and combinations thereof. Additionally, the attachment adhesive composition can be provided on the exterior surface of the absorbent article as a continuous or discontinuous layer in a variety of forms including, e.g., a coating (e.g., a continuous or discontinuous coating), a film (e.g., a continuous or discontinuous film), a spray pattern, randomly, a mass, and combinations thereof, using any suitable technique including, e.g., contact coating, noncontact coating, spraying (e.g., spiral spraying and random spraying), extrusion (e.g., single screw extrusion and twin screw extrusion), slot coating, melt blown, foaming, engraved roller, gravure, screen printing, flexographic printing, brushing, painting, and combinations thereof.

Figure 9:
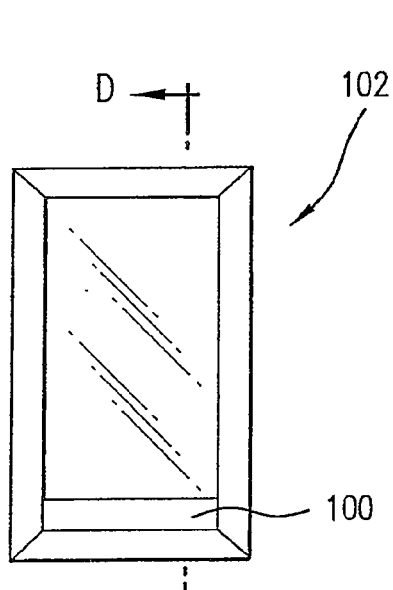
FIG. 9 is a plan view of a window that includes an absorbent article adhered to a surface of the window.
Figure 10:
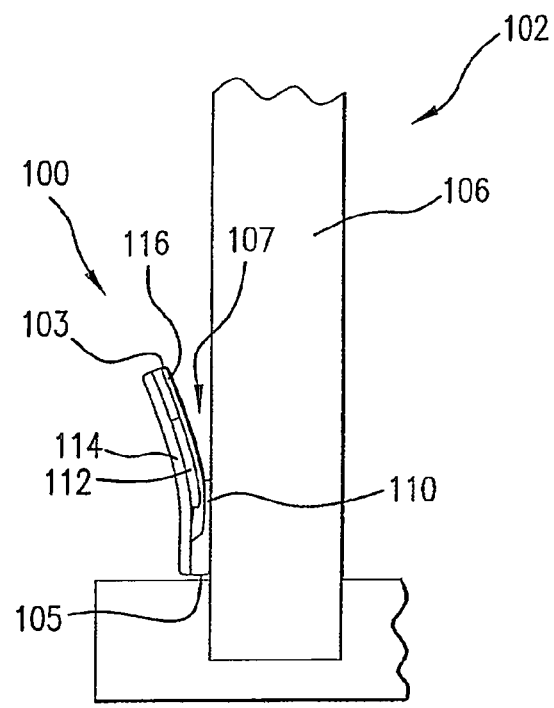
FIG. 10 depicts a cross-sectional view of an absorbent article adhered to a surface of the window of FIG. 9 taken along view line D-D.
Figure 11:
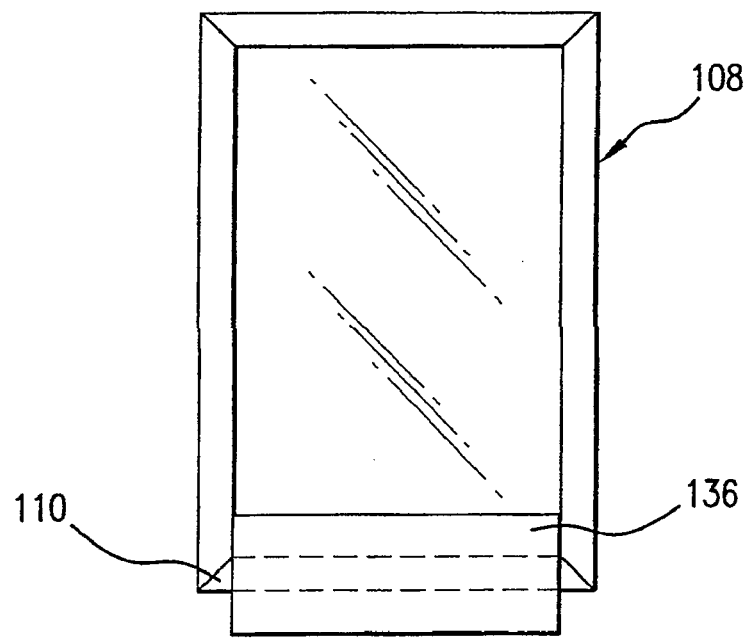
FIG. 11 is a front view of an absorbent article adhered to the surface of the window such that the absorbent article drapes over the trim of the window.

In some embodiments, the absorbent article is adhered to a window such that a portion of the absorbent article is free of adhesion to the window. One method of achieving such a construction includes adhering an absorbent article that includes an attachment adhesive composition on only a portion of an exterior surface thereof to a window so that a portion of the absorbent article is free from adhesion to the window, examples of which are illustrated in FIGS. 9-11 and described in more detail below. In some embodiments, the portion of the absorbent article that is free from adhesion to the window bends away from the surface of the window and forms a trough therewith. The presence of the trough can facilitate absorption of moisture from the surface of the substrate. More specifically, when condensation in the form of water droplets is present on the surface of a window, the absorbent article is positioned such that the traveling water droplets pass into the trough where they contact the absorbent article and are absorbed by the absorbent article. In embodiments where the attachment adhesive composition is in the form of a continuous film, droplets that contact the trough are also available for contact with the continuous film. The continuous film can maintain the water droplets in contact with the exterior surface of the absorbent article and facilitate absorption of the droplets by the absorbent article. In embodiments where the attachment adhesive composition is in the form of a discontinuous film, droplets that travel to the trough and contact the discontinuous film can continue through the spaces between the portions of adhesive film, which also facilitate contact of the water droplets with an exterior surface of the absorbent article and absorption of the droplets.

The absorbent articles can be provided in a variety of forms including, e.g., a web, a mat, a tape (e.g., an adhesive tape (e.g., a pressure sensitive adhesive tape) or a non-adhesive tape), and a tape rolled upon itself in the form of a roll. Useful tapes have a longitudinal extent (i.e., length) that is greater than its latitudinal extent (i.e., width). In some embodiments, the length of the absorbent article is at least 5 times, at least 10 times, or even at least 25 times its width. The absorbent article can be packaged as a kit that includes the absorbent article, e.g., in the form of a roll of tape, and at least one clip for engaging and sealing an edge of the absorbent article. In these embodiments, a user can cut the roll to obtain an absorbent article having a desired length. In some embodiments, the roll is provided with two opposing edges (i.e., a top edge and a bottom edge) that are sealed together along the perimeter of the roll. In these embodiments, once the user cuts the roll to obtain an absorbent article having a desired length, the user can attach one or more clips to the absorbent article to seal the remaining two opposing edges (e.g., a first side edge and a second side edge). In other embodiments, the absorbent article includes perforations at predetermined locations on the article. The perforations allow the article to be separated into predetermined pieces at a perforation by pulling on the article. When the article is in the form of a tape, for example, the tape can include predetermined perforations across the width of the tape, along the longitudinal extent of the tape, and combinations thereof.

Figure 3A:
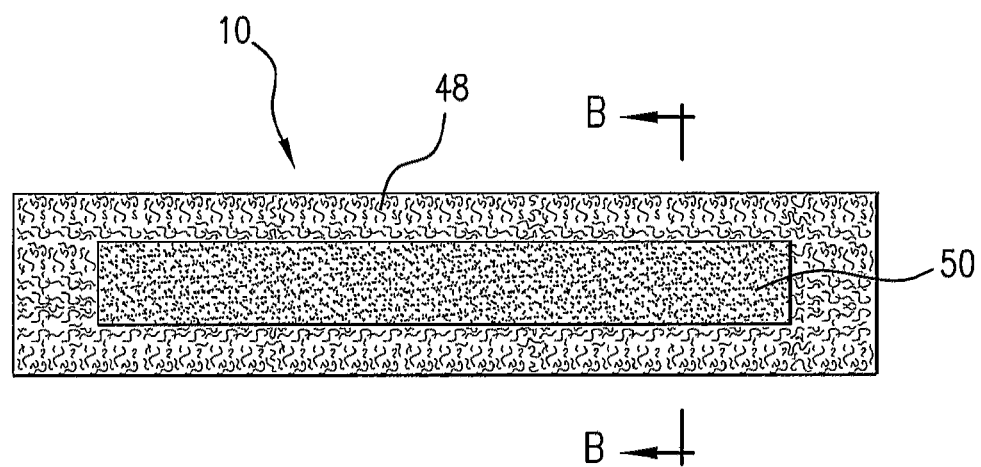
FIG. 3A is a back view of another embodiment of an absorbent article.
Figure 3B:
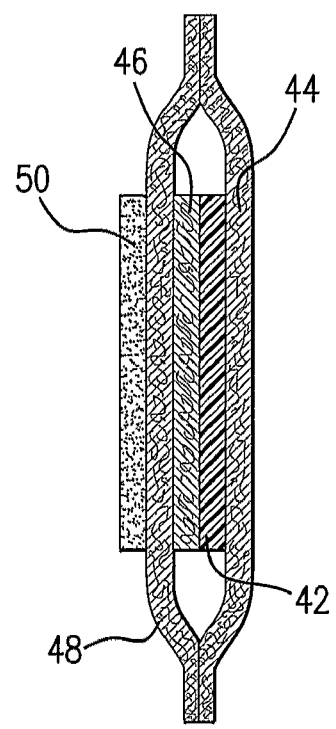
FIG. 3B depicts a cross-sectional view the absorbent article of FIG. 3A taken along view line B-B.

FIGS. 3A and 3B illustrate an embodiment of the absorbent article 40 that includes a first layer 44 that includes a thermoplastic polymer (e.g., a layer of film, nonwoven web or foam), a second layer 46 that includes tissue, superabsorbent polymer 42, and a third layer 48 that includes a non-woven web. The superabsorbent polymer 42 is disposed between the first layer 44 and the second layer 46. An attachment adhesive composition 50 is disposed on at least a portion of non-woven web 48 and is available for contact with a desired surface. The edges along the perimeter of the thermoplastic polymer of the first layer 44 are sealed to the edges along the perimeter of the non-woven web of the third layer 48 to enclose the tissue of the second layer 46 and the superabsorbent polymer 42.

Figure 4:
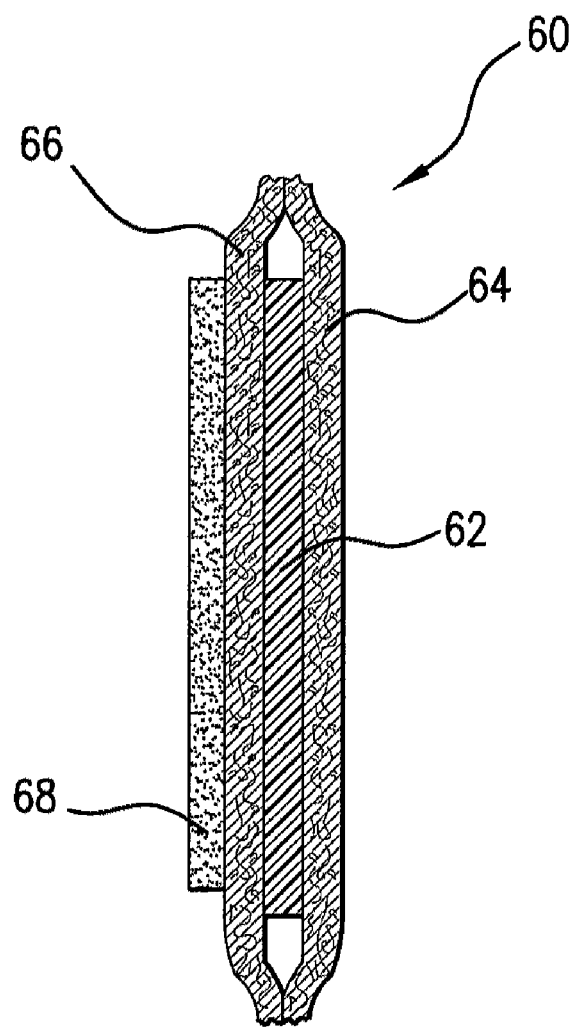
FIG. 4 depicts a cross-sectional view of another embodiment of an absorbent article.

FIG. 4 illustrates an embodiment of the absorbent article 60 that includes a first layer 64 that includes a first heat sealable tissue 64, a second layer 66 that includes a second heat sealable tissue 66, and superabsorbent polymer 62 disposed between the first layer and the second layer. An attachment adhesive composition 68 is disposed on a portion of the second heat sealable tissue of the second layer 66 and is available for contact with surfaces of a substrate. The edges along the perimeter of the first heat sealable tissue of the first layer 64 are sealed to the edges along the perimeter of the second heat sealable tissue of the second layer 66 to enclose the superabsorbent polymer 62.

Figure 5:
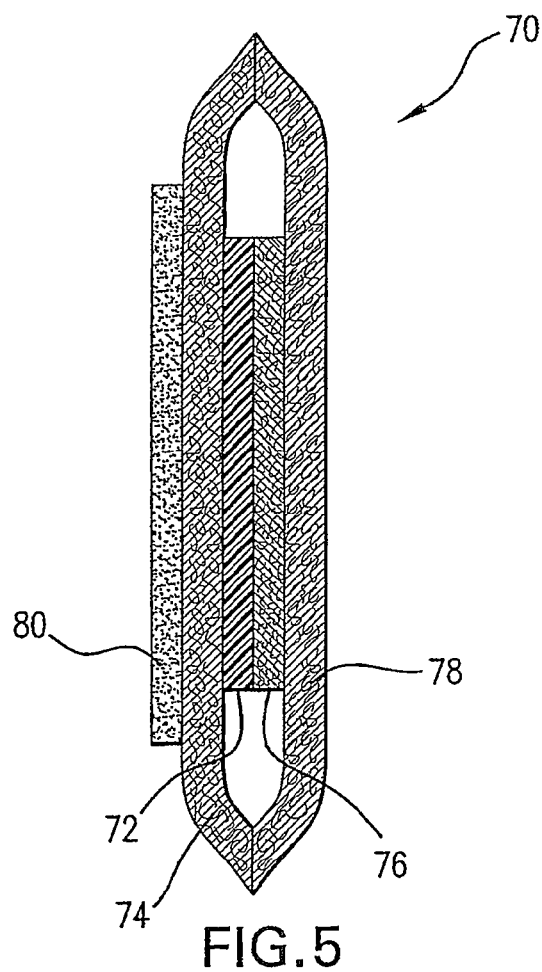
FIG. 5 depicts a cross-sectional view of another embodiment of an absorbent article.

FIG. 5 illustrates an absorbent article 70 that includes a first layer 74 that includes a thermoplastic polymer, a second layer 76 that includes a tissue, superabsorbent polymer 72, and a third layer 78 that includes a non-woven web. The superabsorbent polymer 72 is disposed between the first layer 74 and the second layer 76. An attachment adhesive composition 80 is disposed on the thermoplastic polymer of the first layer 74 and is available for contact with a surface of a substrate. The edges along the perimeter of the thermoplastic polymer of the first layer 74 are sealed to the edges of non-woven web of the third layer 78 to enclose the tissue of the second layer 76 and the superabsorbent polymer 72.

Figure 6:
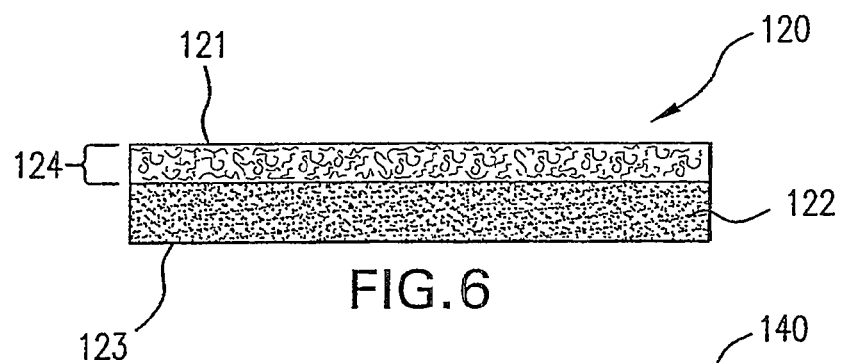
FIG. 6 is a back view of an embodiment of an absorbent article, the adhesive composition extending from the bottom edge of the absorbent article towards the top edge of the absorbent article.
Figure 7:
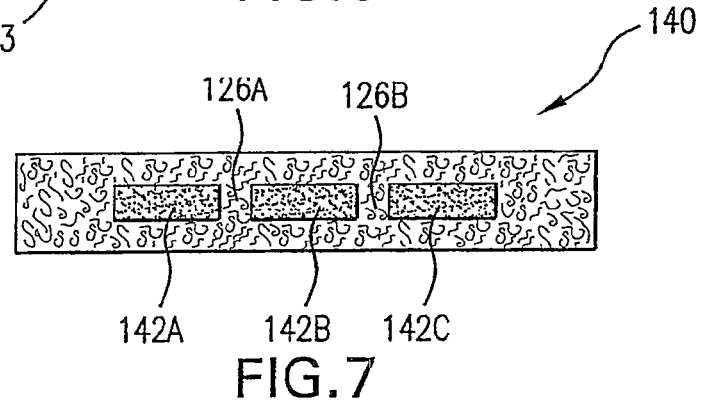
FIG. 7 is a back view of another embodiment of an absorbent article, wherein the attachment adhesive composition is in the form of a discontinuous film.

FIGS. 1, 6 and 7 illustrate absorbent articles that include various configurations of an attachment adhesive composition. Referring to FIG. 1, attachment adhesive composition 22 is in the form of continuous film disposed on the second non-woven web of the fourth layer 20 such that a first portion 21A of the exterior surface of the second non-woven web 20 extending from the top edge 23 of non-woven web toward bottom edge 25 is free of attachment adhesive composition 22. A second portion 21B of exterior surface of the second non-woven web 20 extending from the bottom edge 25 toward the top edge 23 is also free of attachment adhesive composition 22.

As illustrated in FIG. 6, the attachment adhesive composition 122 on the exterior, substrate contacting surface of the absorbent article 120 is in the form of a continuous film disposed on a layer of the absorbent article 120 such that the continuous film of attachment adhesive composition 122 extends from the bottom edge 123 of the absorbent article 120 toward the top edge 121 of the absorbent article 120. A portion 124 of the exterior, substrate contacting surface of the absorbent article 120 is free of the attachment adhesive composition. In some embodiments, attachment adhesive composition 122 extends from the bottom edge 123 of the absorbent article 120 toward the top edge 121 to an extent no greater than about 90% of the distance from bottom edge 123 to top edge 121. In other embodiments, attachment adhesive composition 122 extends from bottom edge 123 toward top edge 121 of the absorbent article 120 an extent of from about 60% to about 85% of the distance from bottom edge 123 to top edge 121.

FIG. 7 illustrates an absorbent article 140 that includes an attachment adhesive composition 142A-142C in the form of a discontinuous film disposed on an exterior surface of a layer of the absorbent article 140. The sections 142A-142C of attachment adhesive are spaced apart from one another leaving adhesive-free areas 126A, 126B therebetween.

Figure 8A:
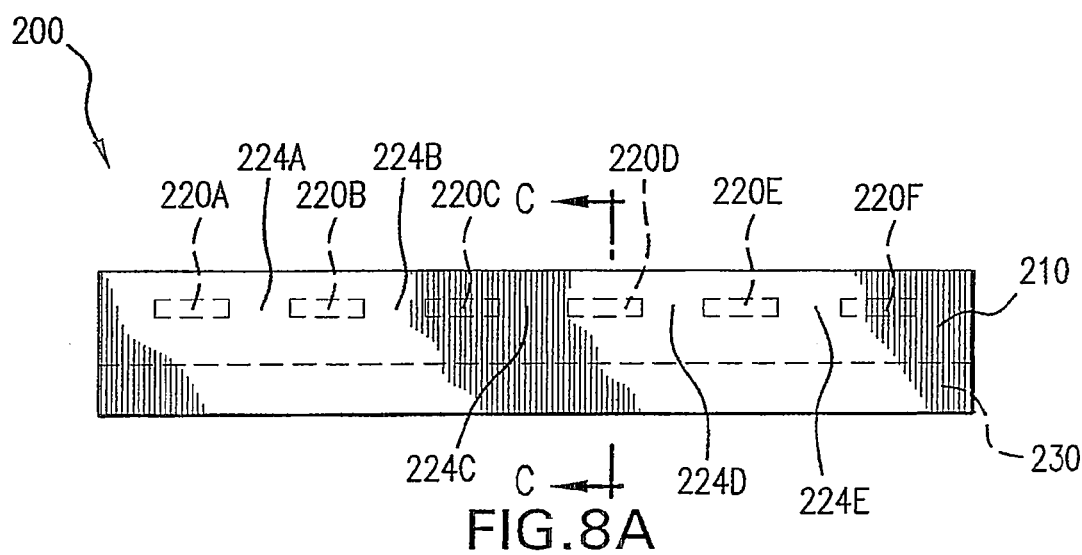
FIG. 8A is a front view of an absorbent article according to another embodiment of the invention.
Figure 8C:
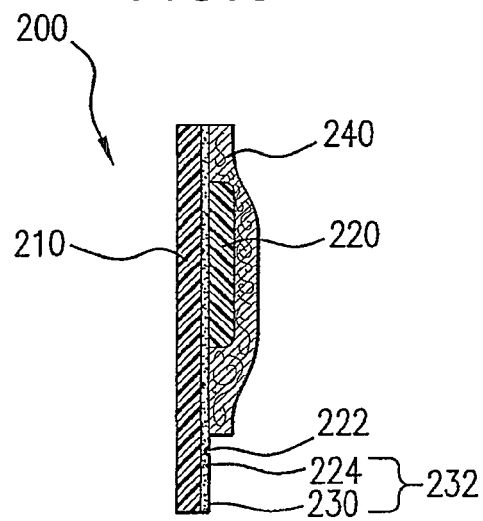
FIG. 8C depicts a cross-sectional view of the absorbent article of FIG. 8A taken along view line C-C.
Figure 8B:
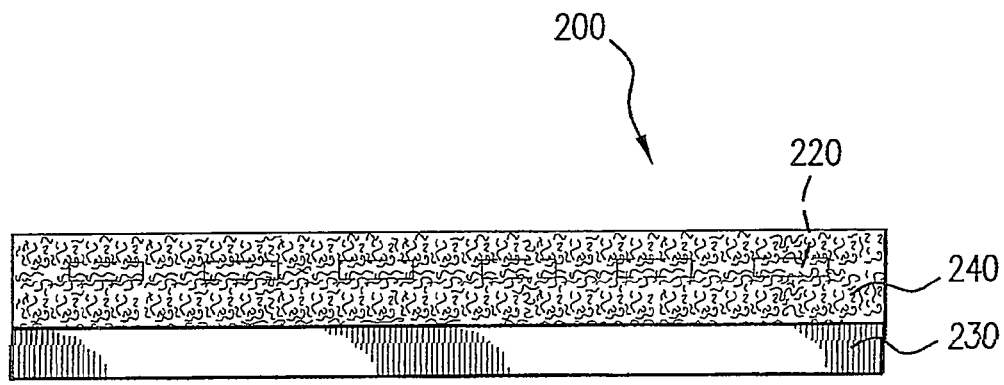
FIG. 8B is a back view of the absorbent article of FIG. 8A.

FIGS. 8A-8C illustrate an embodiment of the absorbent article 200 that includes a support layer 210, a pressure sensitive adhesive composite 230 adhered to the support layer 210, a hot melt superabsorbent polymer composition 220 adhered to the support layer 210 through the pressure sensitive adhesive composite 230, and an acquisition layer (e.g., an absorbent web) 240 adhered to the support layer 210 through the pressure sensitive adhesive composite 230. The hot melt superabsorbent polymer composition 220 is present in the absorbent article 200 in the form of discreet strips 220A-F of hot melt superabsorbent polymer composition spaced apart from each other by areas 224A-E that are free from hot melt superabsorbent polymer composition. In areas 224A-E the acquisition layer 240 is adhered directly to the support layer 210 through the pressure sensitive adhesive composite 230. An exposed portion 232 of the pressure sensitive adhesive composite 230 extends past the area covered by the absorbent web 240 and is available for contact with a surface such as a window. The pressure sensitive adhesive composite 230 includes a scrim 222 (e.g., a nonwoven web) and a pressure sensitive adhesive composition 224 disposed throughout the scrim 222 and on at least the major surfaces of the scrim 222. The scrim provides a matrix for holding the pressure sensitive adhesive composition and imparts strength to the pressure sensitive adhesive composition. The absorbent article 200 optionally includes a release liner (not shown) extending over the exposed portion 232 of the pressure sensitive adhesive composite 230, which can be removed prior to use. In other embodiments, a pressure sensitive adhesive composition bonds the support layer to the acquisition layer. In use, the absorbent article 100 is placed on a desired surface of window 102 such that the attachment adhesive composition contacts a surface (e.g., glass pane, frame or a combination thereof) of the window and adheres the absorbent article 100 to the surface of the window through the attachment adhesive, as illustrated in FIGS. 9 and 10. As moisture condenses on the surface of the window 102, droplets of water will form and run down the surface of the window 102 and into contact with the absorbent article 100. Water droplets contacting the absorbent article 100 move through the exterior layer(s) of the absorbent article and contact the superabsorbent polymer, which will absorb and trap the water within the absorbent article.

FIG. 10 illustrates a use of the absorbent article 100 that includes a nonwoven web 116, a support layer 114, superabsorbent polymer 112 disposed between the nonwoven web 116 and the exterior support layer 114, and an attachment adhesive composition 110. The absorbent article 100 is adhered to a window surface (e.g., a glass pane) through the attachment adhesive composition 110 such that a portion of the absorbent article 100 extending from the top edge 103 toward the bottom edge 105 is free of adhesion to the surface of the window. The portion of the absorbent article 100 that is free of adhesion to the surface of the window 102 defines a trough 107 between the absorbent article 100 and the glass pane 106 of the window 102. As water droplets run down the surface of window 102, the droplets will run into trough 107 and contact an exterior surface of absorbent article 100. As the droplets contact an exterior surface of absorbent article 100, e.g., the absorbent web 116, the droplets will move through the exterior layer(s) of the absorbent article 100 and contact the superabsorbent polymer 112, which will absorb and trap the droplets.

Figure 12:
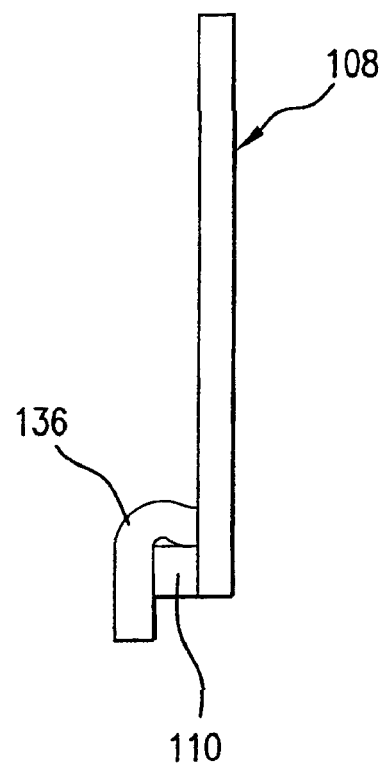
FIG. 12 is a side view of the configuration of FIG. 11.

FIGS. 11 and 12 illustrate a use of an absorbent article in which the absorbent article 136 is adhered to a window 108 such that a portion of the absorbent article 136 is draped over the window trim 110. As water droplets run down the surface of window 108 the droplets will contact and exterior surface of the absorbent article 136 and will move through the exterior layer(s) until the droplet contact the superabsorbent polymer.

Acquisition Layer

The acquisition layer allows moisture to pass from the surface of the absorbent article through to the other components of the absorbent article. The acquisition layer optionally exhibits distribution properties, absorption properties, and combinations thereof. Preferred acquisition layers also distribute water along the acquisition layer and away from the point of contact with the water. The acquisition layer also preferably prevents swelling superabsorbent polymer from passing therethrough. Useful acquisition layers include, e.g., tissues, nonwoven webs and combinations thereof.

Materials useful as a acquisition layer include absorbent fiber layers prepared from nonwoven webs of absorbent fibers including, e.g., natural fibers (e.g., cellulose, wood pulp, cotton, cotton linters, and regenerated cellulose fibers, and mixtures thereof), hollow synthetic (e.g., synthetic thermoplastic polymer) fibers, microfibrillated fibers, and combinations thereof. Synthetic polymers suitable for use in forming hollow fibers include, e.g., polyamides, polyolefins, polyesters, acrylics, ethylene vinyl acetate, and mixtures and copolymers thereof. The absorbent fibers can be formed into a variety of useful webs including, e.g., carded webs (e.g., carded staple fiber webs), webs prepared from fibers and layers joined together by entanglement (e.g., hydraulic entanglement (e.g., using a pressurized stream of air, water and combinations thereof), mechanical entanglement and combinations thereof), air laid webs, wet laid webs, spun bonded webs, and combinations thereof.

Absorbent fiber layers can have any thickness suitable for acquiring moisture from a surface and distributing the moisture to the superabsorbent polymer layer. Useful absorbent fiber layer thicknesses include, e.g., at least about 40 µm, at least about 100 µm, at least about 275 µm, or even at least about 400 µm, and a basis weight of at least about 10 g/m$^2$, at least about 16 g/m$^2$, at least about 40 g/m$^2$, at least about 75 g/m$^2$, or even at least about 100 g/m$^2$.

Useful commercially available absorbent fiber layers include, e.g., paper toweling (e.g., BRAWNY paper towels and wipes available from Georgia Pacific Consumer Products LP (Atlanta, Ga.) and absorbent wipes (e.g., TASK MATE absorbent wipes from and BOUNTY absorbent wipes from Kimberly Clark, Neenah, Wis.).

Tissue

Useful tissue layers include tissues that are liquid permeable, superabsorbent polymer particle impermeable barriers that allow liquids, e.g., water, to pass through the tissue but prevent superabsorbent polymer particles from migrating through the tissue. Suitable examples of tissue layers include cellulose fibers, creped cellulose, comminuted wood pulp, modified crosslinked cellulose fibers, cotton (e.g., woven cotton), and combinations thereof. Useful commercially available tissues include those tissues available under the 1-PLYTISSUE series of trade designations from CityForest Corp. (Ladysmith, Wis.). Useful tissues can have a weight from about 16 g/m$^2$ to about 100 g/m$^2$, from about 25 g/m$^2$ to about 75 g/m$^2$, or even from about 45 g/m$^2$ to about 75 g/m$^2$. In some embodiments, the absorbent articles include heat sealable tissue. Heat sealable tissues can include a polymeric component (e.g., a thermoplastic binder, thermoplastic fibers, and combinations thereof) that softens when heated, which facilitates bonding or sealing of the tissue to another layer. Useful heat sealable paper is available from Hangzhou Xinhua Paper Industry Co., Ltd. (Hangzhou, China).

Non-Woven Web

Useful non-woven webs can provide additional handling strength to the absorbent article. When heat sealable, the edges along the perimeter of the non-woven web can be heat sealed together to enclose the components of the absorbent articles, e.g., the tissue and the superabsorbent polymer. The nonwoven web can be made from a variety of fibers including natural fibers (e.g., cellulose fibers (e.g., cotton fibers and wood pulp fibers), creped cellulose fibers, comminuted wood pulp fibers, modified crosslinked cellulose fibers, and combinations thereof), and synthetic fibers made from a variety of polymers including, polyolefins (e.g., polyethylene and polypropylene), styrene, polyethylene terephthalate, ethylene-vinyl acetate, ethylene-vinyl acetate ethylene-acrylic acid, ethylene-methacrylic acid, ethylene-methyl acrylate, ethylene-ethyl acrylate and ethylene n-butyl acrylate and derivatives thereof (e.g., incorporating at least two comonomers), polyacrylic acids, polymethacrylic acids, polyacrylates, polyvinyl acetates, polylacetic acids, polylactides, caprolactone polymers, poly(hydroxy-butyrate/hydroxyvalerate), polyesters, copolyesters (e.g., biodegradable copolyesters), poly(ethylene oxide)polyether amide, polyester ether block copolymers, polyvinyl pyrrolidone, polyvinyl pyrrolidone-vinyl acetate copolymer, polyetheroxazoline, polyvinyl ethers (e.g., polyvinyl methyl ether), polyamides, polyacrylamide, and combinations thereof. Useful non-woven webs can have basis weight from about 15 g/m$^2$ to about 30 g/m$^2$, from about 17 g/m$^2$ to about 25 g/m$^2$ or even from about 18 g/m$^2$ to about 20 g/m$^2$. Useful spunbonded polyester nonwoven webs are available under the trade designation SPUNBOND by BBA Fiberweb (Old Hickory, Tenn.).

Nonwoven webs can be formed from a variety of processes including, e.g., wet laid, dry laid, air laid, and spunbonded.

Absorbent Layer

Useful absorbent layers include absorbent fibers, e.g., cotton fluff, cellulose fluff, absorbent synthetic polymer fibers, superabsorbent polymer particles, a hot melt superabsorbent polymer composition, and combinations thereof.

Superabsorbent Polymer

The superabsorbent polymer can be in any suitable form including, e.g., a hot melt superabsorbent polymer composition, superabsorbent polymer particles, and combinations thereof. The hot melt superabsorbent polymer composition can be any suitable hot melt superabsorbent polymer composition that includes a thermoplastic polymer and superabsorbent polymer particles including, e.g., a hot melt adhesive composition that includes superabsorbent polymer particles. Useful thermoplastic polymers include, e.g., styrenic block copolymers, polyolefins (e.g., amorphous and crystalline polyolefins including homogeneous and substantially linear ethylene/alpha-olefin interpolymers), interpolymers and copolymers of ethylene including, e.g., ethylene-vinyl acetate, ethylene-vinyl acetate ethylene-acrylic acid, ethylene-methacrylic acid, ethylene-methyl acrylate, ethylene-ethyl acrylate and ethylene n-butyl acrylate and derivatives (e.g., incorporating at least two comonomers), polyacrylic acids, polymethacrylic acids, polyacrylates, polyvinyl acetates, polylacetic acids, polylactides, caprolactone polymers, poly(hydroxy-butyrate/hydroxyvalerate), polyvinyl alcohols, polyesters, copolyesters (e.g., biodegradable copolyesters), poly(ethylene oxide)polyether amide, polyester ether block copolymers, polyvinyl pyrrolidone, polyvinyl pyrrolidone-vinyl acetate copolymer, polyetheroxazoline, polyvinyl ethers (e.g., polyvinyl methyl ether), polyamides, polyacrylamide, and combinations thereof.

A wide variety of block copolymers are useful including, e.g., A-B-A triblock copolymers, A-B diblock copolymers, and (A-B)n radial block copolymers, and branched and grafted versions thereof, wherein the A blocks are non elastomeric polymer blocks, typically comprising polystyrene, and the B blocks are unsaturated conjugated diene or hydrogenated version thereof. Suitable B blocks include, e.g., isoprene, butadiene, ethylene/butylene (hydrogenated butadiene), ethylene/propylene (hydrogenated isoprene), and combinations thereof. Useful block copolymers are commercially available under the KRATON D and G series of trade designations from Shell Chemical Company (Houston, Tex.), EUROPRENE Sol T trade designation from EniChem (Houston, Tex.), and Vector® series of trade designations from Exxon (Dexco) (Houston, Tex.).

Useful commercially available polyolefins include, e.g., AFFINITY substantially linear ethylene polymers polyolefin plastomers from The Dow Chemical Company (Midland, Mich.) and EXACT homogeneous linear ethylene polymers from Exxon Chemical Company (Houston, Tex.). Useful amorphous polyolefins and amorphous polyalphaolefins include homopolymers, copolymers, and terpolymers of $C_2$-$C_8$ alphaolefins. Useful commercially available amorphous polyalphaolefins include, e.g., REXTAC and REXFLEX propylene based homopolymers, ethylene-propylene copolymers and butene-propylene copolymers available from Rexene (Dallas, Tex.), VESTOPLAST alpha-olefin copolymers available from Hüls (Piscataway, N.J.).

Any suitable superabsorbent polymer can be included in the composition. Superabsorbent polymers are also referred to as water-insoluble absorbent hydrogel-forming polymers, "hydrogel-forming" polymers, and "hydrocolloids." Superabsorbent polymers are able to absorb many times their own weight in water. Useful superabsorbent polymers include at least partially crosslinked, at least partially neutralized polymers that gel when contacted with water and are preferably substantially water insoluble. Suitable superabsorbent polymers include, e.g., polysaccharides (e.g., carboxymethyl starch, carboxymethyl cellulose, and hydroxypropyl cellulose), polyvinyl alcohol, polyvinyl ethers, polyvinyl pyridine, polyvinyl morpholinione, N,N-dimethylaminoethyl, N,N-diethylaminopropyl, acrylates, methacrylates, and the quaternary salts thereof. The superabsorbent polymer preferably includes a plurality of functional groups, e.g., sulfonic acid groups, carboxy groups and combinations thereof.

Suitable superabsorbent polymers are prepared from polymerizable, unsaturated, acid-containing monomers including, e.g., olefinically unsaturated acids and anhydrides having at least one carbon-carbon olefinic double bond including, e.g., olefinically unsaturated carboxylic acids and acid anhydrides, olefinically unsaturated sulfonic acids and combinations thereof. Useful olefinically unsaturated carboxylic acid and carboxylic acid anhydride monomers include, e.g., acrylic acid, methacrylic acid, ethacrylic acid, chloroacrylic acid, cyanoacrylic acid, crotonic acid, phenylacrylic acid, acrytoxypropionic acid, sorbic acid, chlorosorbic acid, angelic acid, cinnamic acid, p-chlorocinnamic acid, stearylacrylic acid, itaconic acid, citraconic acid, mesaconic acid, glutaconic acid, aconitic acid, maleic acid, fumaric acid, tricarboxyethylene acid anhydride, maleic acid anhydride, and combinations thereof.

Useful olefinically unsaturated sulfonic acid monomers include aliphatic and aromatic vinyl sulfonic acids (e.g., vinylsulfonic acid, allyl sulfonic acid, vinyl toluene sulfonic acid and styrene sulfonic acid), acrylic and methacrylic sulfonic acids (e.g., sulfoethyl acrylate, sulfoethyl methacrylate, sulfopropyl acrylate, sulfopropyl methacrylate, 2-hydroxy-3-methacryloxypropyl sulfonic acid and 2-acrylamide-2-methylpropane sulfonic acid), and combinations thereof.

Useful superabsorbent polymers that include carboxy groups include, e.g., hydrolyzed starch-acrylonitrile graft copolymers, partially neutralized hydrolyzed starch-acrylonitrile graft copolymers, starch-acrylic acid graft copolymers, partially neutralized starch-acrylic acid graft copolymers, saponified vinyl acetate-acrylic ester copolymers, hydrolyzed acrylonitrile or acrylamide copolymers, slightly network crosslinked polymers of any of the foregoing copolymers, partially neutralized polyacrylic acid, and slightly network crosslinked polymers of partially neutralized polyacrylic acid. These polymers are disclosed, e.g., in U.S. Pat. Nos. 4,076,663, 4,093,776, 4,666,983 and 4,734,478 and incorporated herein.

The absorbent gelling particles can have any suitable property including, e.g., size, shape, morphology and combinations thereof. The superabsorbent particles preferably are spherical or substantially spherical and preferably have an average particle size no greater than about 400 μm, no greater than about 350 μm, no greater than about 200 μm, no greater than about 150 μm, no greater than about 100 μm, no greater than about 100 μm, no greater than about 50 μm, no greater than about 40 μm, at least about 10 μm, at least about 20 μm, or even about 20 μm to about 30 μm.

Useful commercially available superabsorbent particles include, e.g., sodium polyacrylate superabsorbent particles available under the AQUA KEEP series of trade designations including, e.g., particles having a median particle size of from about 20 μm to about 30 μm available under the trade designation AQUA KEEP 10SH-NF, particles having an average particle size of from 200 μm to 300 μm available under the trade designation AQUA KEEP 10SH-P, particles having an average particle size of from 320 μm to 370 μm available under the trade designation AQUA KEEP SA60S, particles having an average particle size of from 350 μm to 390 μm available under the trade designations AQUA KEEP SA60SX, SA55SX II and SA60SL II, particles having an average particle size of from 250 μm to 350 μm available under the trade designation AQUA KEEP SA60N TYPE II from Sumitomo Seika Chemicals Col, Ltd. (Japan), powdered superabsorbent particles available under the AQUASORB series of trade designations including, e.g., AQUASORB A380 and AQUASORB A500 from Hercules Incorporated (Wilmington, Del.), and superabsorbent particles available under the LUQUASORB designations including, e.g., LUQUASORB 1010 and LUGUASORB 1003 from BASF (Florham Park, N.J.). Useful superabsorbent polymer forms include, e.g., particles, granules, flakes, pulverulents, interparticle aggregates, interparticle crosslinked aggregates, fibers, foams, and combinations thereof.

The hot melt superabsorbent polymer composition preferably includes superabsorbent polymer particles in an amount of at least about 30% by weight, at least about 40% by weight, at least about 50% by weight, no greater than about 70% by weight, or even no greater than about 60% by weight.

The hot melt superabsorbent polymer composition can also include other additives including, e.g., plasticizers, tackifying agents, waxes, antioxidants, biocides, chitosan, antimicrobial agents, scenting agents, antifungal agents, zeolites, carbon black, pigments, fillers (e.g., titanium dioxide and hydrophilic fillers), surfactants, phosphites (e.g., IRGAFOS 168), antiblock additives, and combinations thereof.

Useful plasticizers include phthalate plasticizers (e.g., dioctyl phthalate and butyl benzyl phthalate (e.g., Santicizer 160 from Monsanto)), liquid polyesters (e.g., Dynacol 720 from Huls, liquid polymeric plasticizer an example of which is commercially available from C. P. Hall, benzoate plasticizers (e.g., 1,4-cyclohexane dimethanol dibenzoate (e.g., BENZOFLEZ 352 commercially available from Velsicol), diethylene glycol/dipropylene glycol dibenzoate (e.g., BENZOFLEZ 50 commercially available from Velsicol), and diethylene glycol dibenzoate (e.g., commercially available 2-45 High Hydroxyl (Velsicol)), phosphite plasticizers (e.g., t-butyl diphenyl phosphate (e.g., SANTICIZER 154 from Monsanto)), liquid rosin derivatives having Ring and Ball softening points below about 60° C. including, e.g., methyl esters of hydrogenated rosin (e.g., Hercoyn D from Hercules), vegetable oils, and animal oils (e.g., glycerol esters of fatty acids and polymerizable products thereof. citric acid esters (e.g., citric acid esters commercially available under the CITROFLEX series of trade designations), and toluene sulfonamide.

Useful water soluble or water dispersible plasticizers include polyethylene glycol having a molecular weight less than about 2000, derivatives of polyethylene glycol including Pycal 94, the phenyl ether of PEG available from ICI; ethoxylated bis phenol A (e.g., Macol 206 EM from PPG Industries) and dionyl phenol ethyloxylates (e.g., Surfonic DNP from Huntsman Chemical Corp.).

Other useful plasticizers include hydrocarbon oils (paraffinic oils, naphthenic oils and oils having low aromatic content), polybutene, liquid tackifying resins and liquid elastomers. Plasticizer oils are preferably low in volatility, transparent and have as little color and odor as possible.

Useful waxes include 12-hydroxystearamide, N-(2-hydroxy ethyl 12-hydroxy stearamide (Paricin 220 and 285 from CasChem), stearamide (Kemamide S from Witco), glycerin monostearate, sorbitan monostearate, and 12-hydroxy stearic acid. Other useful waxes include paraffin waxes, microcrystalline waxes, Fischer-Tropsch, polyethylene and by-products of polyethylene. Also useful in combination with the above waxes are waxes such as N,N'-ethylene-bis stearamide (Kemamide W-40 from Witco), hydrogenated castor oil (castor wax), oxidized synthetic waxes, and functionalized waxes such as oxidized polyethylene waxes (Petrolite E-1040).

Waxes can be present in the composition to reduce viscosity as well as increase the blocking resistance of the compositions. The compositions preferably includes from about 2% by weight to about 25% by weight, or even from about 10% by weight to about 20% by weight wax.

Useful tackifying agents include, e.g., resins derived from renewable resources such as rosin derivatives including wood rosin, tall oil and gum rosin, as well as rosin esters, natural and synthetic terpenes and derivatives thereof, aliphatic, aromatic and mixed aliphatic-aromatic petroleum based tackifiers. Examples of useful hydrocarbon resins include alpha-methyl styrene resins, branched and unbranched $C_5$-$C_{10}$ resins and styrenic and hydrogenated modifications thereof. Useful tackifying resins range from being a liquid at 37° C. to having a ring and ball softening point of about 135° C. The composition can include tackifying resin in an amount from 0% by weight to about 50% by weight, from about 5% by weight to about 40% by weight, or even from about 10% by weight to about 20% by weight.

Useful antioxidants include, e.g., hindered phenolics (e.g., IRGANOX 1010, IRGANOX 1076).

Hydrophilic fillers are a preferred class of additives, which are useful to alter the surface properties and/or increase the rate of absorption. Hydrophilic fillers include calcium carbonate, hydroxyethyl cellulose, hydroxypropyl cellulose, starch and cellulose esters (e.g., acetates), attagel clay, guargum, bentonite, hectonite, diatomaceous earth, talc, and combinations thereof.

Suitable surfactants include nonionic, anionic, and silicone surfactants. The composition can include surfactant in an amount from 0% by weight to about 25% by weight, or even from about 5% by weight to about 15% by weight.

The hot melt superabsorbent polymer composition can include one or more antimicrobial agents. The antimicrobial agents can be dissolved or suspended in the thermoplastic polymer of the composition. The antimicrobial agents can be mixed into the hot melt superabsorbent polymer composition, applied to the surface thereof, and combinations thereof. The antimicrobial agents also can be introduced into the composition by adding the additive in a powder form or adding an additive agent carried on a powder support to the composition. Any suitable antimicrobial agent can be used including, e.g., sulfadiazine, silver ions, silver sulfadiazine, benzalkonium chloride, cetalkonium chloride, methylbenzethonium, neomycin sulfate, hexachlorophene, eosin, penicillin G, cephalothin, cephaloridine, tetracycline, linkomycin, nystatin, kanamycin, penicillinase-resistant penicillins, fradiomycin sulfate, camphor, and combinations thereof. The concentrations of the antimicrobial agents can range from about 0.01% by weight to 5% by weight based on the weight of the hot melt superabsorbent polymer composition.

Useful hot melt superabsorbent polymer compositions are described in, e.g., U.S. Pat. Nos. 6,534,572, and 6,458,877, and U.S. patent application Ser. Nos. 10/050,375 (published as U.S. Publication No. 2003/0134552), and 11/007,470, and incorporated herein. Useful hot melt superabsorbent polymer compositions are commercially available under the HYDROLOCK series of trade designations from H.B. Fuller Company (Vadnais Heights, Minn.).

The hot melt superabsorbent polymer composition can be provided in a variety of forms including, e.g., a coating (e.g., a continuous or discontinuous coating), a film (e.g., a continuous or discontinuous film), a spray pattern, a mass, and combinations thereof, using any suitable technique including, e.g., contact coating, noncontact coating, spraying (e.g., spiral spraying and random spraying), extrusion (e.g., single screw extrusion and twin screw extrusion), slot coating, melt blown, foaming, engraved roller, gravure, screen printing, flexographic and compositions thereof.

The configuration, location and amount of the hot melt superabsorbent polymer composition present in the article is selected to optimize the absorbent properties of the dressing including, e.g., penetration time, penetration rate, wet back, absorbent capacity, fluid retention, and combinations thereof. The hot melt superabsorbent polymer composition can be present in the article in a variety of configurations including, e.g., random, pattern, stripes, dots having a variety of shapes (e.g., round, oval, square, diamond, and triangle), wavy lines, spiral spray, fanciful forms (e.g., leaves, flowers, and petals), and combinations thereof.

One useful configuration includes a number of stripes of hot melt superabsorbent polymer composition, which can exist in a variety of configurations including, e.g., single or multiple stripes (e.g., one, two, three, four, and five), and continuous or discontinuous stripes. Where multiple stripes of hot melt superabsorbent polymer are present any suitable spacing between the individual regions can exist including, e.g., constant (e.g., equal spacing distances) or variable spacing distances. The stripes can also be positioned in any orientation including, e.g., along the length of the article, the width of the article, at any angle to the longitudinal axis of the article, at any angle to the latitudinal axis of the article, and combinations thereof. The width and length of the stripes can also be constant or variable. The spacing between the regions of hot melt superabsorbent polymer composition is preferably sufficient to allow the superabsorbent polymer freedom to expand as it would when contacted with water. When hot melt superabsorbent polymer composition is present in the form of regions in the absorbent article, the article can be cut in the areas that are free of superabsorbent polymer without creating an opening through which the superabsorbent polymer can expand as it absorbs water.

Any amount of hot melt superabsorbent polymer composition can be present in the absorbent article. Preferably the absorbent article includes hot melt superabsorbent polymer composition in an amount of at least about 10 grams per square meter ($g/m^2$), at least about 20 $g/m^2$, at least about 50 $g/m^2$, at least about 100 $g/m^2$, at least about 150 $g/m^2$, at least about 250 $g/m^2$, at least about 500 $g/m^2$, or even from about 50 $g/m^2$ to about 500 $g/m^2$.

When the superabsorbent polymer is present as superabsorbent polymer particles, the particles can have any average per particle size suitable for use in absorbent articles. Useful superabsorbent polymer particles include particles having an average particle size about 10 μm to about 800 μm, from about 25 μm to about 600 μm, from about 50 μm to about 400 μm, or even from 75 μm to 200 μm.

Support Layer

The absorbent article optionally includes a support layer for maintaining the structural integrity of the absorbent article. The support layer can optionally exhibit thermal insulating properties to insulate the air at the exterior surface of the absorbent article from the temperature of the substrate with which the absorbent article is in contact. Useful support layers include, e.g., thermoplastic polymer, elastomeric polymer, thermoset polymer, foam and combinations thereof.

Polymer Film

In some embodiments the absorbent article includes a thermoplastic polymer film. Useful polymer films include films formed from polyester, polyethylene terephthalate, polyethylene, polypropylene, polyamide, poly vinyl chloride, poly vinyl alcohol, ethylene vinyl acetate and combinations and mixtures thereof. The polymer film preferably has a thickness of at least about 0.5 mil, at least about 1 mil, or even at least about 5 mil. The polymer film can include a pigment to provide exterior surface on the absorbent article having a desired aesthetic including, e.g., white, brown, and black color.

Foam Layer

The layer of foam, when present, preferably exhibits sufficient rigidity to maintain structural integrity when adhered to a window through the attachment adhesive, preferably during the period when the superabsorbent polymer is swelled from moisture absorption. The foam can have any thickness and density. Preferred foams have a thickness of at least about 0.4 mm, at least about 1 mm, at least about 2 mm, or even from about 0.4 mm to about 10 mm, and a density of at least about 10 $kg/m^3$, at least about 30 $kg/m^3$, at least about 40 $kg/m^3$, or even from about 20 $kg/m^3$ about 100 $kg/m^3$.

Useful foams include closed cell foams and open cell foams. Preferably, the foam is a closed cell foam.

The foam can be formed from a variety of natural and synthetic polymer compositions including polyurethane, polypropylene, polyethylene, and combinations thereof.

Attachment Adhesive Composition

The attachment adhesive composition can be any adhesive composition suitable for adhering the absorbent article to a desired surface including, e.g., wood, glass, metal, and polymer surfaces, and painted surfaces (e.g., sheet rock and wall board) of a window, door or wall. Suitable adhesive compositions include, e.g., low tack adhesives, removable adhesives, repositionable adhesives, remoistenable adhesives, pressure sensitive adhesives and combinations thereof. Useful pressure sensitive adhesives include pressure sensitive adhesive compositions in which the base polymer includes, e.g., block copolymer (e.g., styrene-isoprene-styrene, styrene-butadiene-styrene, styrene-ethylene-butylene-styrene, and styrene-ethylene-propylene-styrene), acrylic acid, acrylate, silicone, polyurethane, polyurethane elastomers, polyester, polyester elastomers (e.g., aliphatic-aromatic copolyesters, copolyester-copolyether and copolyether-copolyamide), polylacetic acid, polyoxyalkanoates, and combinations thereof. Useful adhesives are described in, e.g., U.S. Pat. No. 7,091,300 to Luhmann et al. and U.S. Pat. No. 7,081,498 to Moeller et al., which are incorporated herein.

Suitable adhesive compositions include block copolymer (e.g., styrene-butadiene-styrene and styrene-isoprene-styrene), a tackifying agent and plasticizer. Examples of useful commercially available pressure sensitive adhesive compositions include PD-2155, HL 2268, and HL 2243 pressure sensitive adhesive compositions from H.B. Fuller Company (St. Paul, Minn.).

Construction Adhesive Composition

Where present, the construction adhesive can be any adhesive suitable for maintaining at least two of the components of the absorbent article in fixed relation to each other. The attachment adhesive composition can also function as the construction adhesive composition. The construction adhesive can be applied to the periphery of a layer, the major surface of the layer, the perimeter of the absorbent article and combinations thereof. When applied to the perimeter or periphery, the construction adhesive can be in the form of a continuous or discontinuous coating. When applied to a major surface of the layer, the construction adhesive is provided as a discontinuous coating. The construction adhesive can be applied as a discontinuous coating using any suitable method that produces any suitable discontinuous coating including, e.g., a spiral spray, random spray, gravure, dot and random fiberization. Useful construction adhesives include, e.g., hot melt adhesives, pressure sensitive adhesives, hot melt pressure sensitive adhesives, and blends thereof. One example of a suitable commercially available construction adhesive is HL-1713 styrene-isoprene-styrene based construction adhesive from H.B. Fuller Company (Vadnais Heights, Minn.).

One example of a useful form of the construction adhesive is a pressure sensitive adhesive composite that includes a scrim and a pressure sensitive adhesive composition disposed on the scrim such that the pressure sensitive adhesive composition is present throughout the openings of the scrim and on the two major surfaces of the scrim. The resulting composite is tacky on two major surfaces. The pressure sensitive adhesive composite can function to bond one or more of the components of the absorbent article together, as attachment adhesive, and combinations thereof. Pressure sensitive adhesive compositions suitable for use in the pressure sensitive adhesive composite include the pressure sensitive adhesive compositions set forth above in the discussion of the attachment adhesive.

The pressure sensitive adhesive composition can be present on and in the scrim as a continuous or discontinuous layer (e.g., a coating or a film) in a pattern or randomly. The amount of pressure sensitive adhesive composition required will vary depending on the intended application and nature of the pressure sensitive adhesive composition. Examples of useful coat weights include at least about 50 g/m$^2$, at least about 100 g/m$^2$, or even at least about 125 g/m$^2$.

The scrim of the pressure sensitive adhesive composite is a very thin, highly porous, web (e.g., a woven or nonwoven web). Useful scrims can have any suitable basis weight or thickness including, e.g., a basis weight no greater than about 50 g/m$^2$, no greater than about 25 g/m$^2$, or even no greater than about 20 g/m$^2$, and a thickness no greater than about 300 µm or even no greater than about 200 µm. Useful scrims also exhibit good strength in the machine direction. A scrim with sufficient integrity imparts strength to a very thin pressure sensitive adhesive film and enables the use of very thin films or coatings of pressure sensitive adhesive composition.

Scrims can be made from a variety of thermoplastic polymers including, e.g., polyester, polyolefin, polyamide, ethylene vinyl acetate, and mixtures and copolymers thereof. One example of a useful commercially available scrim is BBA polyester nonwoven web having a basis weight of 18 g/m$^2$ (53 ounces/square yard) from BBA Fiberweb, Inc. (Old Hickory, Tenn.).

The components of the absorbent article can be joined together in any suitable manner including, e.g., joining such that each component is directly secured to another component, a component is secured to an intermediate component, a component is integral with another component, and combinations thereof.

Release Liner

The absorbent articles can optionally include a release liner to protect the utility of the adhesive composition prior to use and for ease of handling. Where present, the release liner is removed prior to using the absorbent article. Any suitable release liner can be used including, e.g., liners made of or coated with polyethylene, polypropylene and fluorocarbons, and silicone coated release papers and polyester films. Useful commercially available release liners include, e.g., silicone coated release papers available under the POLYSLIK trade designations including POLYSLIK S-8004 83 pound bleached silicone release paper from H. P. Smith Co. (Chicago, Ill.) and 2-80-BKG-157 80 pound bleached two-sided silicone coated paper from Daubert Chemical Co. (Dixon, Ill.).

Other embodiments are within the claims. Although the absorbent article has been described with respect to its use on windows and doors, the absorbent article can also be used in conjunction with a variety of substrates on which moisture condenses including, e.g., metal (e.g. aluminum, steel, nickel and iron) substrates, ceramic substrates, glass substrates, painted walls (e.g., sheet rock and wallboard), and structures that include the same.

Corner Mechanism

Figure 13A:
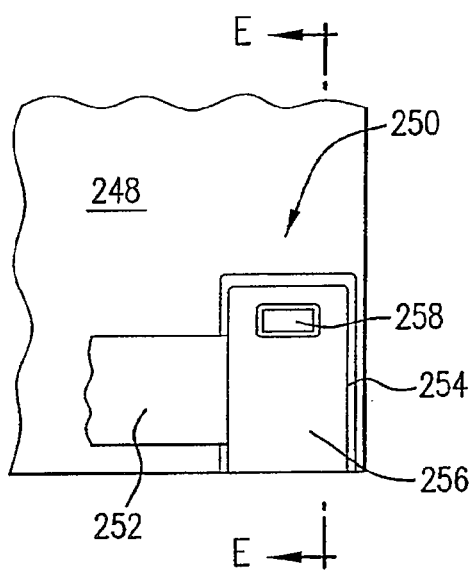
FIG. 13A is a front view of a clip attached to a glass pane of a window surface and holding an absorbent article.
Figure 13B:
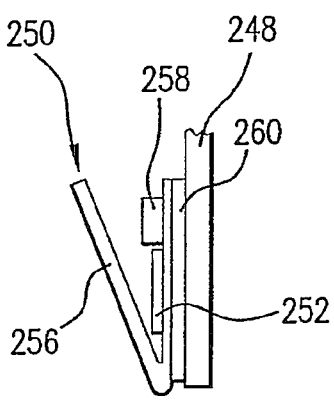
FIG. 13B is a cross-sectional view of the construction of FIG. 13A taken along view line E-E with the clip in the open position.
Figure 13C:
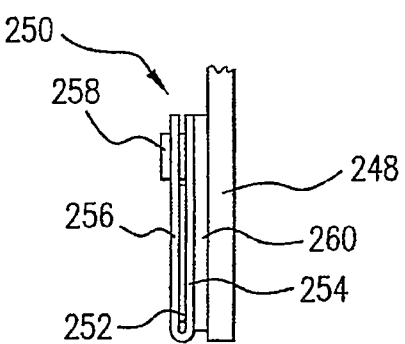
FIG. 13C is a cross-sectional view of the construction of FIG. 13A taken along view line E-E with the clip in the closed position

The absorbent article optionally can be used in conjunction with a mechanism to provide a variety of functions including, e.g., aiding in directing the flow of moisture that condenses or accumulates at or near the corner of a window (e.g., in the corner of a window where the glass meets the frame) toward the absorbent article, filling a gap between the end of the absorbent article and a corner of a window, the attaching the absorbent article to the window, and combinations thereof. Examples of suitable corner mechanisms include clip, clasp, stop, spacer, and combinations thereof. Preferably the corner mechanism and the absorbent article are arranged such that moisture does not accumulate in the corner of a window and does not seep around the absorbent article and onto the frame of the window. FIGS. 13A-C illustrate a clip 250 in which an absorbent article 252 is affixed. The clip 250 is attached to a glass pane 248 of a window through an attachment adhesive composition 260. The clip 250 is located at the corner edge of the window formed by the glass pane 248 and the frame (not shown) of the window. The clip 250 is a continuous structure that includes a back plate 254 and a front plate 256 folded over on the back plate 254, e.g., through a living hinge. A locking member 258 that protrudes from the back plate 254 passes through an opening (not shown) in the front plate 256 and is maintained therein through a friction fit or snap fit. A portion of the absorbent article 252 is pinched between the front 256 and back plate 254 of the clip 250 when the clip 250 is in a closed position. The clip 250 aids in directing condensation toward the absorbent article and optionally in maintaining the absorbent article in position against the window. Any suitable clip construction can be used. To reduce leaking of the hot melt superabsorbent polymer composition, the portion of the absorbent article located at or near the corner of the window preferably is free of superabsorbent polymer.

The invention will now be described further by way of the following examples. All parts, ratios, percents and amounts stated in the Examples are by weight unless otherwise specified.

EXAMPLES

Humidity Chamber Test Method

The specimen is adhered to the glass pane of a window unit that includes two glass panes each of which is bonded at its edges to a polymer frame. A plexiglass sheet is attached to the frame such that it is flush with the surface of the bottom edge of the frame and open at the top edge of the unit so as to create a space near the top edge of the glass pane between the glass pane and the sheet of plexiglass and an opening through which air can enter.

Figure 14:
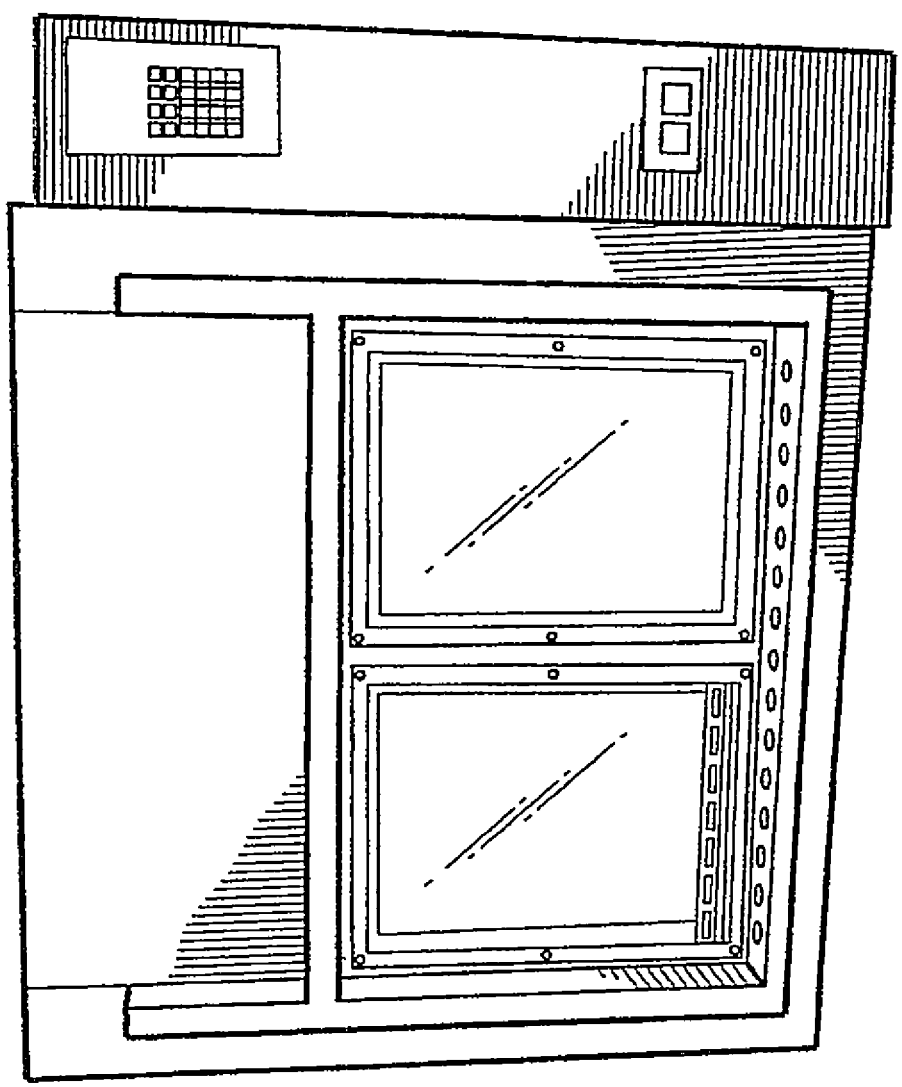
FIG. 14 is a picture of a test apparatus that includes a window in the opening of a environmental chamber.

The test unit is then attached to an environmental cooling chamber in place of the existing chamber door. With the temperature of the environmental chamber set below the dew point of the surrounding atmosphere, water vapor is allowed to condense on the glass surface and to travel due to the force of gravity to the base of the window frame and into contact with the specimen. FIG. 14 is a picture of the test apparatus affixed to the opening of a environmental cooling chamber.

After four hours the specimen is observed and the observations are recorded.

Example 1

A discontinuous strip of NW 1120B hot melt adhesive superabsorbent polymer composition (H.B. Fuller Company, St. Paul, Minn.) is coated on a release liner and then hot laminated onto a nonwoven web of cellulose and thermoplastic polymer fibers, which has a basis weight of 18 g/m$^2$, in the form of one inch×¼ inch strips of hot melt adhesive composition separated by a 7/16 inch spacing. A second nonwoven web of cellulose and thermoplastic polymer fibers having a basis weight of 18 g/m$^2$ is then placed on top of the hot melt superabsorbent polymer strip and heat sealed to the exposed area of the first nonwoven web. PD 2155 removable water-based acrylic pressure sensitive adhesive composition prepared from butyl acrylate (H.B. Fuller Company) is coated on the exterior surface of the first nonwoven web.

Example 2

A coating of NW 1100 hot melt superabsorbent polymer composition (H.B. Fuller Company, St. Paul, Minn.) is drawn down by hand to form a film. Two sheets of toilet tissue are hot air laminated to the NW-1100 film. The composite is slit into 0.75 inch wide strips. An eight inch portion of the slit strip is then placed between two pieces polypropylene fiber nonwoven web having a basis weight of 18 g/m², which is heat sealed along its perimeter to form a closed bag. A strip of double-sided pressure sensitive adhesive tape is adhered to the backside (i.e., exterior surface) of the construction and covered with a release liner.

Example 3

A mass of NW 1120B hot melt superabsorbent polymer composition is placed between two sheets of a commercial grade heat sealable tissue paper tea bag. The pores of the tissue are observed to be smaller and more uniform relative to the pores of the tissue of Example 1. When water is squirted on the construction it is expected to swell and to be free of superabsorbent polymer leakage.

Example 4

A pressure sensitive adhesive scrim is prepared by coating HL-2643 hot melt styrene-isoprene-styrene rubber-based permanent pressure sensitive adhesive composition (H.B. Fuller Company) at a coating weight of 112 g/m² on a polyester nonwoven web having a basis weight of 18 g/m². The resulting pressure sensitive adhesive scrim is adhered to a discontinuous strip of NW 1120B hot melt superabsorbent polymer composition, which is in the form one inch×¼ inch strips separated by a ⁷⁄₁₆ inch spacing. A quilted non-woven web 159.51 g/m² is bonded to the pressure sensitive adhesive scrim so as to sandwich the hot melt superabsorbent polymer composition. A polyester film having a thickness of 2.0 mil is adhered to the surface of the pressure sensitive adhesive scrim opposite the quilted nonwoven web such that a portion of the adhesive scrim is available for contact with a window. The construction is similar to that shown in FIGS. 8A-8C.

Example 5

A pressure sensitive adhesive scrim is prepared by coating HL-2643 hot melt styrene-isoprene-styrene rubber-based permanent pressure sensitive adhesive composition (H.B. Fuller Company) at a coating weight of 112 g/m on a polyester nonwoven web having a basis weight of 18 g/m². The resulting pressure sensitive adhesive scrim is adhered to a discontinuous strip of NW 1120B hot melt superabsorbent polymer composition, which is in the form of one inch×¼ inch strips separated by a ⁷⁄₁₆ inch spacing. A 13 pound cellulose fiber tissue having a polymeric binder and exhibiting wet strength is bonded to the pressure sensitive adhesive scrim so as to sandwich the hot melt superabsorbent polymer composition. A polyester film having a thickness of 1.0 mil is adhered to the surface of the pressure sensitive adhesive scrim opposite the tissue such that a portion of the adhesive scrim is available for contact with a window. The construction is similar to that shown in FIGS. 8A-8C.

Example 6

A pressure sensitive adhesive scrim is prepared by coating HL-2643 hot melt styrene-isoprene-styrene rubber-based permanent pressure sensitive adhesive composition (H.B. Fuller Company) at a coating weight of 112 g/m² on a polyester nonwoven web having a basis weight of 18 g/m². The resulting pressure sensitive adhesive scrim is adhered to a discontinuous strip of NW 1120B hot melt superabsorbent polymer composition, which is in the form of one inch×¼ inch strips separated by a ⁷⁄₁₆ inch spacing. A portion of a sheet of paper toweling is bonded to the pressure sensitive adhesive scrim so as to sandwich the hot melt superabsorbent polymer composition between the paper toweling and the scrim. A polyester film having a thickness of 2.0 mil is adhered to the surface of the pressure sensitive adhesive scrim opposite the paper toweling such that a portion of the adhesive scrim is available for contact with a window. The construction is similar to that shown in FIGS. 8A-8C.

Example 7

A pressure sensitive adhesive scrim is prepared by coating HL-2643 hot melt styrene-isoprene-styrene rubber-based permanent pressure sensitive adhesive composition (H.B. Fuller Company) at a coating weight of 112 g/m² on a polyester nonwoven web having a basis weight of 18 g/m². The resulting pressure sensitive adhesive scrim was adhered to a discontinuous strip of NW 1120B hot melt superabsorbent polymer composition, which is in the form of one inch×¼ inch strips separated by a ⁷⁄₁₆ inch spacing. A layer of closed cell foam having a density of 42.01 kg/m³ and a thickness of 1.87 mm is then adhered to the major surface of the pressure sensitive adhesive scrim opposite the hot melt superabsorbent polymer composition. A web of TASKMATE paper toweling is adhered to the surface of the pressure sensitive adhesive scrim that included the hot melt superabsorbent polymer composition so as to sandwich the hot melt superabsorbent polymer composition between the TASKMATE paper toweling and pressure sensitive adhesive scrim such that a portion of the adhesive scrim is available for contact with a window. The construction is similar to that shown in FIGS. 8A-8C.

Example 8

A specimen is prepared according to Example 7 with the exception that the pressure sensitive adhesive composition is HL-2268 hot melt styrene-isoprene-styrene rubber-based removable adhesive composition (H.B. Fuller Company).

Example 9

A specimen is prepared according to Example 7 with the exception that the pressure sensitive adhesive composition is HL-2268 hot melt styrene-isoprene-styrene rubber-based removable pressure sensitive adhesive composition (H.B. Fuller Company).

Example 10

A specimen is prepared according to Example 7 with the exception that the adhesive composition is HL-2643 hot melt styrene-isoprene-styrene rubber-based permanent pressure sensitive adhesive composition (H.B. Fuller Company).

Example 11

A pressure sensitive adhesive scrim is prepared by coating a PD-2155 removable water-based acrylic pressure sensitive adhesive composition prepared from butyl acrylate (H.B. Fuller Company) at a coating weight of 120 g/m² on a polyester nonwoven web having a basis weight of 18 g/m². The resulting pressure sensitive adhesive scrim is adhered to a discontinuous strip of NW 1120B hot melt superabsorbent polymer composition, which is in the form of one inch×¼ inch strips separated by a ⁷⁄₁₆ inch spacing. A 13 pound cellulose fiber tissue having a polymeric binder and exhibiting wet strength is bonded to the pressure sensitive adhesive scrim so as to sandwich the hot melt superabsorbent polymer composition between the adhesive scrim and the tissue. A polyester film having a thickness of 1.0 mil is adhered to the surface of the pressure sensitive adhesive scrim opposite the tissue such that a portion of the adhesive scrim is available for contact with a window. The construction is similar to that shown in FIGS. 8A-8C.

Example 12

A discontinuous strip of NW 1120B hot melt adhesive superabsorbent polymer composition (H.B. Fuller Company) is coated on a release liner, then hot laminated onto a 13 pound cellulose fiber tissue having a polymeric binder and exhibiting wet strength. HL-2268 hot melt rubber-based removable adhesive composition (H.B. Fuller Company) is coated at a coating weight of 112 g/m² on a polyester film having a thickness of 1.0 mil, and then adhered to the surface of the 13 pound tissue so as to sandwich the hot melt superabsorbent polymer composition between the tissue and the removable adhesive such that a portion of the removable adhesive is available for contact with a window. The construction is similar to that shown in FIGS. 8A-8C with the exception that the adhesive is not in the form of an adhesive scrim.

The absorbent articles of Examples 1-11, when tested according to the Humidity Chamber test method are expected to give the results are set forth in Table 1.

TABLE 1

| Example | Performance Result |
| --- | --- |
| 1 | Superabsorbent polymer leaked out through the relatively large random pores in the tissue layer. After moistening the construction began to lose contact with the window. |
| 2 | Swelled up like a hot dog. Superabsorbent polymer leaked through the nonwoven web. After moistening the construction began to lose contact with the window. |
| 4 | Exhibited good structural integrity in an upright position against the window. Condensate formed on the back, i.e., window contacting side, of the film. |
| 5 | Exhibited adequate structural integrity in an upright position against the window. Condensate formed on the back, i.e., window contacting side, of the film. |
| 6 | Exhibited good structural integrity in an upright position against the window. Condensate formed on the back, i.e., window contacting side, of the film. |
| 7 | Reasonable water dispersive properties and good strength for retention of superabsorbent polymer. Good structural integrity. No condensation formed on the film. |
| 8-10 | Reasonable water dispersive properties and good strength for retention of superabsorbent polymer. |
| 11 | Exhibited adequate structural integrity in an upright position against the window. Condensate formed on the back, i.e., window contacting side, of the film. |

The constructions of Examples 4-7 and 10-12 are adhered to the surface of a window surface and the performance of the attachment adhesive is observed. The expected results are as set forth below in Table 2.

TABLE 2

| Example | Attachment Adhesive composition | Observations |
| --- | --- | --- |
| 4-7 and 10 | HL-2643 hot melt styrene-isoprene-styrene rubber-based permanent pressure sensitive adhesive composition (+) a scrim | The attachment adhesive exhibits good adhesion to glass and tissue. Attachment adhesive penetrates into tissue fibers when used in a lamination. No visible residue after removal. |
| 8 and 9 | HL-2268 hot melt styrene-isoprene-styrene rubber-based removable adhesive composition (+) a scrim | The attachment adhesive is easily removed from glass. No visible residue after removal. |
| 11 | PD 2155 removable water-based acrylic pressure sensitive adhesive composition prepared from butyl acrylate | The attachment adhesive exhibits good adhesion to glass, but low adhesion to tissue after moistening. No visible residue after removal. |
| 12 | HL-2268 hot melt rubber-based removable adhesive composition | Adhesive residue present on glass upon removal from window. The attachment adhesive exhibits low adhesion to tissue after moistening. |

All references disclosed herein are incorporated herein by reference.

Other embodiments are within the claims.

The invention claimed is:

1. An absorbent article comprising:
an exterior surface, an interior surface and a longitudinal extent;
an acquisition layer comprising absorbent fibers;
a superabsorbent polymer;
a layer of closed cell foam having an exterior surface and an interior surface;
a release liner; and
a pressure sensitive attachment adhesive composition,
the superabsorbent polymer being disposed between the acquisition layer and the interior surface of the layer of closed cell foam,
the pressure sensitive attachment adhesive composition having a first major surface and a second major surface, the pressure sensitive attachment adhesive composition being disposed on the interior surface of the layer of closed cell foam such that the first major surface of the pressure sensitive attachment adhesive composition is in direct contact with the interior surface of the layer of closed cell foam,
the release liner being disposed on the second major surface of the pressure sensitive attachment adhesive composition.

2. The absorbent article of claim 1 further comprising a hot melt superabsorbent polymer composition comprising a thermoplastic polymer and the superabsorbent polymer.

3. The absorbent article of claim 2, wherein the hot melt superabsorbent polymer composition further comprises an additive selected from the group consisting of scenting agents, antimicrobial agents, antifungal agents, biocide, and combinations thereof.

4. The absorbent article of claim 1 further comprising a nonwoven web, the superabsorbent polymer being disposed between the nonwoven web and the interior surface of the layer of closed cell foam.

5. The absorbent article of claim 1, wherein the superabsorbent polymer is in direct contact with the layer of closed cell foam.

6. The absorbent article of claim 1, wherein the superabsorbent polymer is adhered to the layer of closed cell foam.

7. A method of using the absorbent article of claim 1, the method comprising adhering at least a portion of the absorbent article to a surface of a window through the pressure sensitive adhesive composition.

8. The method of claim 7, wherein the adhering comprises adhering the absorbent article to a glass surface of the window.

9. The method of claim 7, further comprising a pressure sensitive adhesive composite comprising a nonwoven web and the pressure sensitive attachment adhesive composition disposed on the nonwoven web of the composite.

10. The method of claim 7, wherein the absorbent article further comprises a predetermined crease extending along a major portion of a longitudinal extent of the absorbent article.

11. The method of claim 7, wherein the absorbent article further comprises
a top edge, and
a bottom edge opposite the top edge,
the pressure sensitive attachment adhesive extending from the bottom edge of the absorbent article toward the top edge of the absorbent article such that a portion of the exterior surface of the absorbent article extending from the top edge toward the bottom edge is free of the pressure sensitive attachment adhesive composition.

12. The method of claim 7, wherein the absorbent article is in the form of a tape.

13. The method of claim 7, wherein the absorbent article further comprises a hot melt superabsorbent polymer composition comprising the superabsorbent polymer and a thermoplastic polymer, the hot melt superabsorbent polymer composition being present in spaced apart regions in the absorbent article.

14. The method of claim 7, wherein the absorbent article further comprises a nonwoven web disposed between the acquisition layer and the superabsorbent polymer.

15. The method of claim 7 further comprising
attaching a clip to the window surface; and
affixing a portion of the absorbent article in the clip.

16. A kit comprising:
an absorbent article in the form of a tape wound up on itself in the form of a roll, the absorbent article comprising:
an exterior surface, an interior surface and a longitudinal extent,
an acquisition layer comprising absorbent fibers,
a superabsorbent polymer,
a layer of closed cell foam having an exterior surface and an interior surface;
a release liner; and
a pressure sensitive attachment adhesive composition,
the superabsorbent polymer being disposed between the acquisition layer and the interior surface of the layer of closed cell foam,
the pressure sensitive attachment adhesive composition having a first major surface and a second major surface, the pressure sensitive attachment adhesive composition being disposed on at least one of the acquisition layer and the interior surface of the layer of closed cell foam such that the first major surface of the pressure sensitive attachment adhesive composition is in direct contact with the interior surface of the layer of closed cell foam,
the release liner being disposed on the second major surface of the pressure sensitive attachment adhesive composition; and
at least one clip dimensioned to engage an edge of the absorbent article.

17. An absorbent article comprising:
an exterior surface, an interior surface and a longitudinal extent;
an acquisition layer comprising absorbent fibers;
a superabsorbent polymer;
a layer of closed cell foam having an exterior surface and an interior surface;
a release liner; and
a pressure sensitive adhesive composite comprising a nonwoven web comprising a first major surface and a second major surface and a pressure sensitive attachment adhesive composition, the pressure sensitive attachment adhesive composition being disposed throughout the nonwoven web of the pressure sensitive adhesive composite and on the first major surface and the second major surface of the nonwoven web,
the superabsorbent polymer being disposed between the acquisition layer and the interior surface of the layer of closed cell foam, and being in direct contact with the layer of closed cell foam,
the pressure sensitive adhesive composite having a first major surface and a second major surface, the pressure sensitive adhesive composite being disposed on at least one of the acquisition layer and the interior surface of the layer of closed cell foam such that the first major surface of the pressure sensitive adhesive composite is in direct contact with at least one of the acquisition layer and the interior surface of the layer of closed cell foam,
the release liner being disposed on the second major surface of the pressure sensitive adhesive composite.

18. An absorbent article comprising:
an exterior surface, an interior surface and a longitudinal extent;
an acquisition layer comprising absorbent fibers;
a superabsorbent polymer;
a layer of closed cell foam having an exterior surface and an interior surface;
a release liner; and
a pressure sensitive adhesive composite comprising a nonwoven web comprising a first major surface and a second major surface and a pressure sensitive attachment adhesive composition, the pressure sensitive attachment adhesive composition being disposed throughout the nonwoven web of the pressure sensitive adhesive composite and on the first major surface and the second major surface of the nonwoven web, the pressure sensitive adhesive composite being disposed between the superabsorbent polymer and the interior surface of the layer of closed cell foam,
the superabsorbent polymer being disposed between the acquisition layer and the interior surface of the layer of closed cell foam,
the pressure sensitive adhesive composite having a first major surface and a second major surface, the pressure sensitive adhesive composite being disposed on at least one of the acquisition layer and the interior surface of the layer of closed cell foam such that the first major surface of the pressure sensitive adhesive composite is in direct contact with at least one of the acquisition layer and the interior surface of the layer of closed cell foam,
the release liner being disposed on the second major surface of the pressure sensitive adhesive composite.

19. An absorbent article comprising:
an exterior surface, an interior surface and a longitudinal extent;
an acquisition layer comprising absorbent fibers;
a superabsorbent polymer;
a layer of closed cell foam having an exterior surface and an interior surface;
a release liner; and a pressure sensitive adhesive composite comprising a nonwoven web comprising a first major surface and a second major surface and a pressure sensitive attachment adhesive composition, the pressure sensitive attachment adhesive composition being disposed throughout the nonwoven web of the pressure sensitive adhesive composite and on the first major surface and the second major surface of the nonwoven web, the superabsorbent polymer being disposed between the acquisition layer and the interior surface of the layer of closed cell foam and being adhered to the interior surface of the layer of closed cell foam through the pressure sensitive adhesive composite, the pressure sensitive adhesive composite having a first major surface and a second major surface, the pressure sensitive adhesive composite being disposed on the interior surface of the layer of closed cell foam such that the first major surface of the pressure sensitive adhesive composite is in direct contact with the interior surface of the layer of closed cell foam, the release liner being disposed on the second major surface of the pressure sensitive adhesive composite.

* * * * *

UNITED STATES PATENT AND TRADEMARK OFFICE
CERTIFICATE OF CORRECTION

| | | |
|---|---|---|
| PATENT NO. | : 8,329,292 B2 | Page 1 of 1 |
| APPLICATION NO. | : 11/895178 | |
| DATED | : December 11, 2012 | |
| INVENTOR(S) | : James E. Toonen et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 652 days.

Signed and Sealed this
Twenty-eighth Day of October, 2014

Michelle K. Lee
*Deputy Director of the United States Patent and Trademark Office*